(12) United States Patent
Fujii et al.

(10) Patent No.: US 10,269,497 B2
(45) Date of Patent: Apr. 23, 2019

(54) ELECTRONIC COMPONENT

(71) Applicant: Murata Manufacturing Co., Ltd., Nagaokakyo-shi, Kyoto-fu (JP)

(72) Inventors: Yasuo Fujii, Nagaokakyo (JP); Takashi Sawada, Nagaokakyo (JP); Takayuki Kayatani, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 30 days.

(21) Appl. No.: 15/611,888

(22) Filed: Jun. 2, 2017

(65) Prior Publication Data

US 2017/0352488 A1    Dec. 7, 2017

(30) Foreign Application Priority Data

Jun. 6, 2016   (JP) ................... 2016-112716

(51) Int. Cl.
*H01G 4/30* (2006.01)
*H01G 4/232* (2006.01)
(Continued)

(52) U.S. Cl.
CPC ............... *H01G 4/30* (2013.01); *H01G 4/005* (2013.01); *H01G 4/008* (2013.01); *H01G 4/012* (2013.01);
(Continued)

(58) Field of Classification Search
CPC .......... H01G 4/252; H01G 4/30; H01G 4/232; H01G 4/005
USPC ............. 361/321.1, 301.4, 303, 306.1, 306.3
See application file for complete search history.

(56) References Cited

U.S. PATENT DOCUMENTS

| | | | |
|---|---|---|---|
| 6,159,768 A * | 12/2000 | Ahn ............ | H01C 13/02 438/107 |
| 2012/0169180 A1* | 7/2012 | Saruban ............ | H01G 4/012 310/311 |

(Continued)

FOREIGN PATENT DOCUMENTS

| | | |
|---|---|---|
| JP | 08162357 A * | 6/1996 |
| JP | 2014-241452 A | 12/2014 |
| KR | 10-2013-0025595 A | 3/2013 |
| KR | 10-1452058 B1 | 10/2014 |

OTHER PUBLICATIONS

Sawada et al., "Multilayer Ceramic Electronic Component," U.S. Appl. No. 15/611,874, filed Jun. 2, 2017.
Sawada et al., "Multilayer Ceramic Electronic Component," U.S. Appl. No. 15/611,884, filed Jun. 2, 2017.
(Continued)

*Primary Examiner* — Eric Thomas
*Assistant Examiner* — Arun Ramaswamy
(74) *Attorney, Agent, or Firm* — Keating & Bennett, LLP

(57) ABSTRACT

An electronic component includes a laminated body including dielectric layers and internal electrode layers, a first external electrode, a pair of second external electrodes, and a pair of insulating coating portions. The internal electrode layers include first and second internal electrode layers, the second internal electrode layers each include first and second extended electrode portions. A relationship of L1/L2>1.0 is satisfied when a length of a first contact portion with one second external electrode in contact with the first extended electrode portion in the length direction is L1, and a length of a second contact portion with the other second external electrode in contact with the second extended electrode portion in the length direction is L2.

19 Claims, 18 Drawing Sheets

(51) Int. Cl.
*H01G 4/005* (2006.01)
*H01G 4/008* (2006.01)
*H01G 4/12* (2006.01)
*H01G 4/228* (2006.01)
*H01G 4/012* (2006.01)
*H01G 4/224* (2006.01)

(52) U.S. Cl.
CPC ........... *H01G 4/1218* (2013.01); *H01G 4/224* (2013.01); *H01G 4/228* (2013.01); *H01G 4/232* (2013.01); *H01G 4/1227* (2013.01); *H01G 4/1236* (2013.01)

(56) References Cited

U.S. PATENT DOCUMENTS

| | | | |
|---|---|---|---|
| 2013/0050897 A1* | 2/2013 | Kim | H01G 4/12 361/321.2 |
| 2013/0058006 A1 | 3/2013 | Kim | |
| 2014/0160615 A1 | 6/2014 | Lee et al. | |
| 2016/0049241 A1 | 2/2016 | Uno et al. | |
| 2016/0141103 A1* | 5/2016 | Hamanaka | H01G 4/012 361/301.4 |

OTHER PUBLICATIONS

Kayatani et al., "Multilayer Ceramic Electronic Component," U.S. Appl. No. 15/611,880, filed Jun. 2, 2017.
Kayatani et al., "Multilayer Ceramic Electronic Component," U.S. Appl. No. 15/611,887, filed Jun. 2, 2017.

* cited by examiner

FIG. 22

| | L1/L2 | RESISTANCE AT FIRST EXTENDED ELECTRODE OF SECOND INTERNAL ELECTRODE LAYER (R22) | RESISTANCE AT EXTENDED ELECTRODE OF FIRST INTERNAL ELECTRODE LAYER (R21) | RESISTANCE AT SECOND EXTENDED ELECTRODE OF SECOND INTERNAL ELECTRODE LAYER (R23) | ANTIRESONANCE Z [Ω] | REDUCTION IN ANTIRESONANCE Z IN COMPARISON WITH COMPARATIVE EXAMPLE 1 |
|---|---|---|---|---|---|---|
| COMPARATIVE EXAMPLE 1 | 1.00 | 4.00 | 4 | 4.00 | 0.812 | 0 |
| EXAMPLE 2 | 1.20 | 3.67 | 4 | 4.40 | 0.809 | 0.09 |
| EXAMPLE 3 | 1.40 | 3.43 | 4 | 4.79 | 0.805 | 0.165 |
| EXAMPLE 4 | 1.60 | 3.25 | 4 | 5.19 | 0.798 | 0.23 |
| EXAMPLE 5 | 1.70 | 3.17 | 4 | 5.41 | 0.793 | 0.26 |
| EXAMPLE 1 | 9.00 | 2.22 | 4 | 20.00 | 0.541 | 0.8 |

ELECTRONIC COMPONENT

CROSS REFERENCE TO RELATED APPLICATIONS

This application claims the benefit of priority to Japanese Patent Application No. 2016-112716 filed on Jun. 6, 2016. The entire contents of this application are hereby incorporated herein by reference.

BACKGROUND OF THE INVENTION

1. Field of the Invention

The present invention relates to an electronic component including a laminated body including dielectric layers and internal electrode layers that are alternately laminated.

2. Description of the Related Art

Japanese Patent Application Laid-Open No. 2014-241452 discloses a conventional multilayer ceramic capacitor, for example. The multilayer ceramic capacitor disclosed in Japanese Patent Application Laid-Open No. 2014-241452 is a three-terminal multilayer ceramic capacitor, which includes a first external electrode provided on a central portion of the bottom surface of a laminated ceramic body, and a pair of second external electrodes provided on both ends of the bottom surface so that the first external electrode is located therebetween.

The laminated ceramic body includes multiple internal electrode layers disposed substantially perpendicular to the bottom surface, and the multiple internal electrode layers are laminated in a direction parallel to the bottom surface. The multiple internal electrode layers include first internal electrode layers connected to the first external electrode, and second internal electrode layers connected to each of the pair of second external electrodes. The second internal electrode layers each include a first extended electrode portion extended to the bottom surface and connected to one of the pair of second external electrodes, and a second extended electrode portion extended to the bottom surface and connected to the other of the pair of second external electrodes.

The first extended electrode portion is almost equal in length to the second extended electrode portion in a length direction of the multilayer ceramic capacitor, which is parallel to the direction in which the pair of second external electrodes is arranged, and one of the second external electrodes is almost equal in length to the other thereof in the length direction.

For this reason, in a mounted structure with the multilayer ceramic capacitor mounted on a wiring substrate, the resistance value of a current passing through the side with one of the second external electrodes is almost equal to or substantially equal to the resistance value of a current passing through the side with the other one of the second external electrodes when currents flow from the second external electrodes to the first external electrode.

When the multilayer ceramic capacitor is mounted on a wiring substrate along with an IC or other suitable device, antiresonance may be caused by equivalent series inductance (ESL), which is the parasitic inductance of the multilayer ceramic capacitor, and the inductance of a wiring and other structure on the wiring substrate, as well as the capacitance of the IC and the capacitance between a power plane and a ground plane.

In the multilayer ceramic capacitor disclosed in Japanese Patent Application Laid-Open No. 2014-241452, it is not possible to suppress the antiresonance, because the resistance value when passing through the side with one of the second external electrodes is almost equal to or substantially equal to the resistance value when passing through the side with the other one of the second external electrodes.

As a way of suppressing the antiresonance, it is conceivable to configure the first extended electrode portion and the second extended electrode portion so as to differ in length, or to configure the second eternal electrodes to differ in length from each other.

However, depending on the manufacturing accuracy, the first extended electrode portions and the second extended electrode portions may vary in location or length in some cases, or the first external electrode and the pair of second external electrodes may vary in location or length in some cases. When this variation is increased, there is concern that the extended electrode portions of the first internal electrode layers, and the first extended electrode portions and second extended electrode portions of the second internal electrode layers will be exposed to the outside, thus decreasing reliability.

SUMMARY OF THE INVENTION

Preferred embodiments of the present invention provide electronic components which are able to reduce the impedance at the antiresonant frequency while ensuring reliability.

An electronic component according to a preferred embodiment of the present invention includes a laminated body including a plurality of dielectric layers and a plurality of internal electrode layers that are laminated, and including a first side surface and a second side surface opposite to each other in a laminating direction, a first principal surface and a second principal surface opposite to each other in a height direction perpendicular or substantially perpendicular to the laminating direction, and a first end surface and a second end surface opposite to each other in a length direction perpendicular or substantially perpendicular to both of the laminating direction and the height direction, a first external electrode provided on a central portion of the second principal surface in the length direction, a pair of second external electrodes provided on both ends of the second principal surface in the length direction, such that the first external electrode is located between the second external electrodes, and a pair of insulating coating portions filling gaps between each of the pair of second external electrodes and the first external electrode on the second principal surface, the plurality of internal electrode layers include plurality of first internal electrode layers connected to the first external electrode, and a plurality of second internal electrode layers connected to each of the pair of second external electrodes, the second internal electrode layers each include a first extended electrode portion connected to one of the pair of second external electrodes, and a second extended electrode portion connected to the other of the pair of second external electrodes, and a relationship of L1/L2>1.0 is satisfied when a length of a first contact portion with one second external electrode in contact with the first extended electrode portion in the length direction is denoted by L1, and a length of a second contact portion with the other second external electrode in contact with the second extended electrode portion in the length direction is denoted by L2.

In an electronic component according to a preferred embodiment of the present invention, the relationship of L1/L2≥1.2 is preferably satisfied.

In an electronic component according to a preferred embodiment of the present invention, the relationship of $L1/L2 \geq 1.4$ is preferably satisfied.

In an electronic component according to a preferred embodiment of the present invention, the relationship of $L1/L2 \geq 1.6$ is preferably satisfied.

In an electronic component according to a preferred embodiment of the present invention, a length of an end of the first extended electrode portion that extends to the second principal surface in the length direction may be larger than a length of an end of the second extended electrode portion that extends to the second principal surface in the length direction.

In an electronic component according to a preferred embodiment of the present invention, a length of an end of the first extended electrode portion that extends to the second principal surface in the length direction may be equal to or substantially equal to a length of an end of the second extended electrode portion that extends to the second principal surface in the length direction. In this case, a length of one second external electrode in the length direction is preferably larger than a length of the other second external electrode in the length direction.

In an electronic component according to a preferred embodiment of the present invention, protrusions of the first extended electrode portion and the second extended electrode portion from the pair of second external electrodes in the length direction are preferably covered with the pair of insulating coating portions.

In an electronic component according to a preferred embodiment of the present invention, the pair of insulating coating portions preferably includes overlapping portions overlapping with respective portions of the first external electrode and pair of second external electrodes in the length direction. In this case, the overlapping portions of the pair of insulating coating portions may cover the respective portions of the first external electrode and pair of second external electrodes.

In an electronic component according to a preferred embodiment of the present invention, the pair of insulating coating portions may preferably include overlapping portions overlapping with respective portions of the first external electrode and pair of second external electrodes in the length direction. In this case, the overlapping portions of the pair of insulating coating portions may be covered with the respective portions of the first external electrode and pair of second external electrodes.

In an electronic component according to a preferred embodiment of the present invention, a maximum thickness of the pair of insulating coating portions on the second principal surface may be larger than a maximum thickness of the first external electrode thereon and a maximum thickness of the pair of second external electrodes thereon.

In an electronic component according to a preferred embodiment of the present invention, a maximum thickness of the pair of insulating coating portions on the second principal surface may be smaller than a maximum thickness of the first external electrode thereon and a maximum thickness of the pair of second external electrodes thereon.

In an electronic component according to a preferred embodiment of the present invention, the pair of insulating coating portions preferably includes a material including a dielectric ceramic, a resin, or glass.

In an electronic component according to a preferred embodiment of the present invention, the pair of insulating coating portions may include a material including the dielectric ceramic. In this case, the dielectric ceramic preferably includes $BaTiO_3$, $CaTiO_3$, $SrTiO_3$, or $CaZrO_3$, for example.

In an electronic component according to a preferred embodiment of the present invention, the pair of insulating coating portions may include a material including the resin. In this case, the resin preferably includes an epoxy-based resin or a polyimide-based resin, for example.

In an electronic component according to a preferred embodiment of the present invention, the pair of insulating coating portions may include a material including the glass. In this case, the glass preferably includes Ba or Sr, for example.

According to various preferred embodiments of the present invention, electronic components reduce the impedance at the antiresonant frequency while ensuring reliability.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 22 is a diagram showing conditions and results of a verification experiment preformed to confirm the advantageous effects of a multilayer ceramic capacitor according to a preferred embodiment of the present invention.

DETAILED DESCRIPTION OF THE PREFERRED EMBODIMENTS

Preferred embodiments of the present invention will be described in detail below with reference to the drawings. It is to be noted that multilayer ceramic capacitors will be exemplified and described as the electronic component in the following preferred embodiments. In addition, in the following preferred embodiments, like or common components and features are denoted by like symbols in the figures, and the descriptions of the portions will not be repeated.

First Preferred Embodiment

Figure 1:
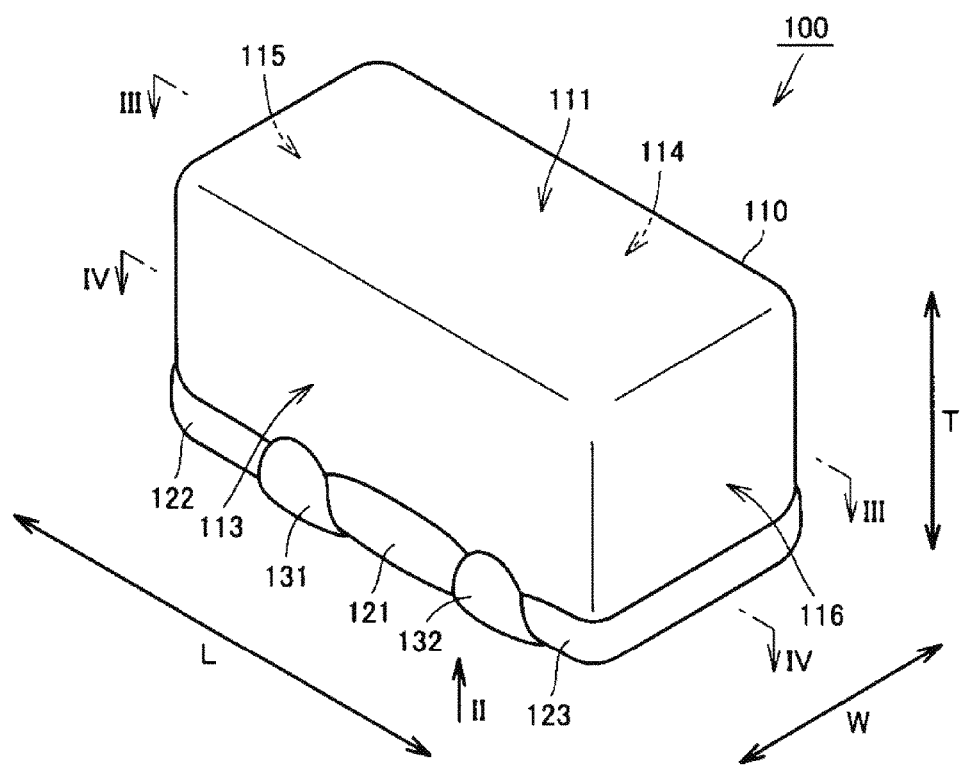
FIG. 1 is a perspective view of a multilayer ceramic capacitor according to a preferred embodiment of the present invention.
Figure 2:
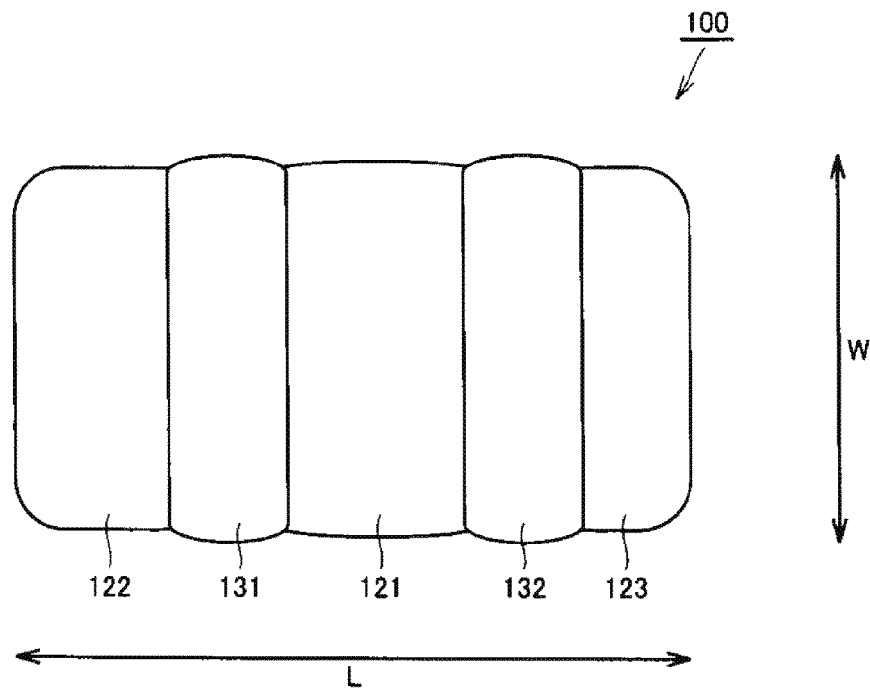
FIG. 2 is a diagram illustrating a side with a second principal surface of the multilayer ceramic capacitor according to a preferred embodiment of the present invention.
Figure 3:
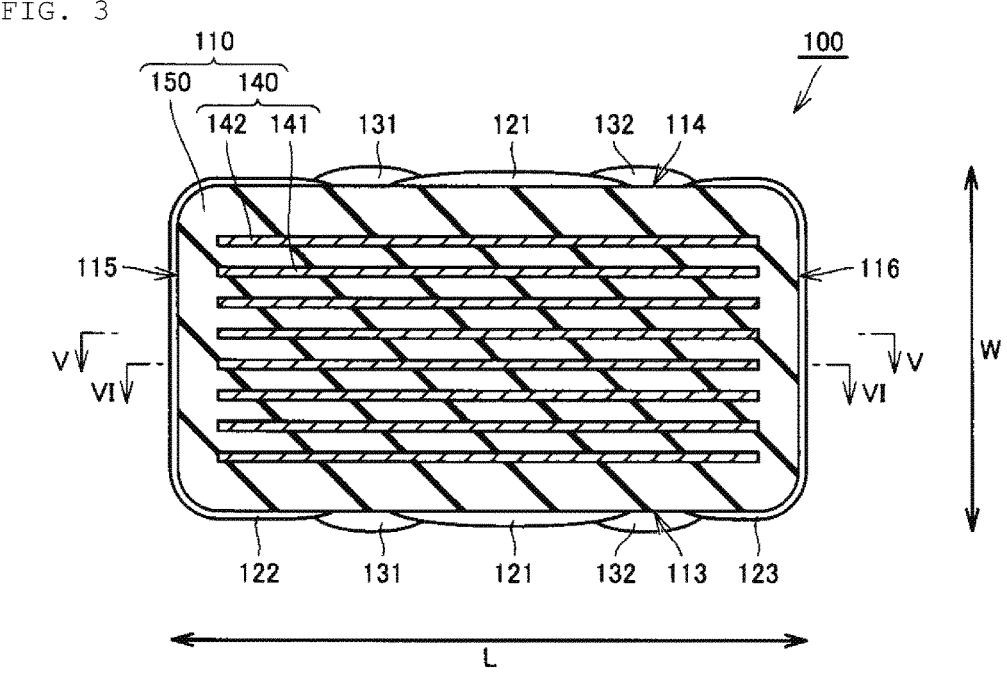
FIG. 3 is a cross-sectional view along line III-III shown in FIG. 1.
Figure 4:
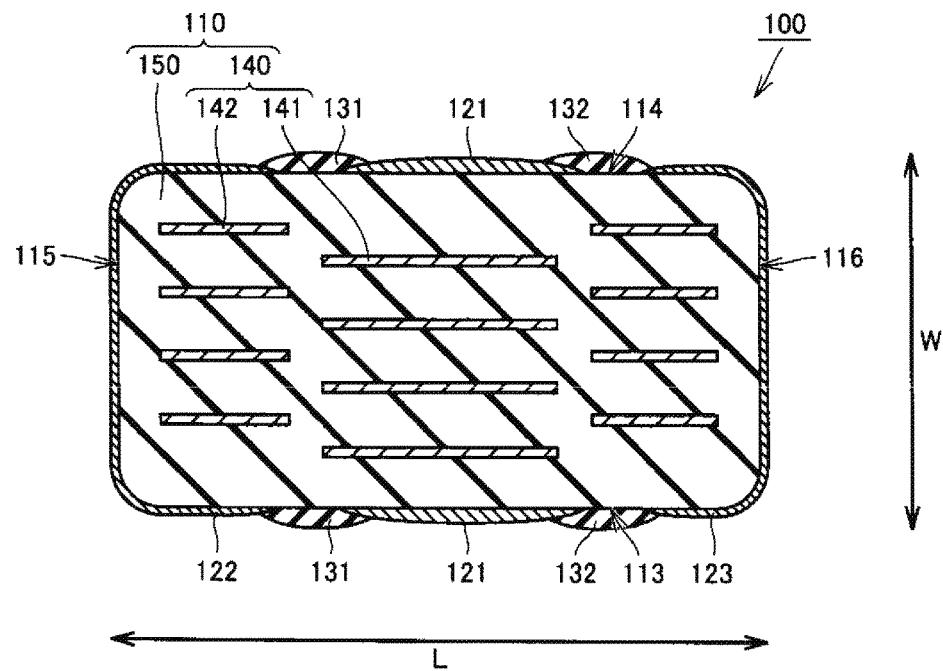
FIG. 4 is a cross-sectional view along line IV-IV shown in FIG. 1.
Figure 5:
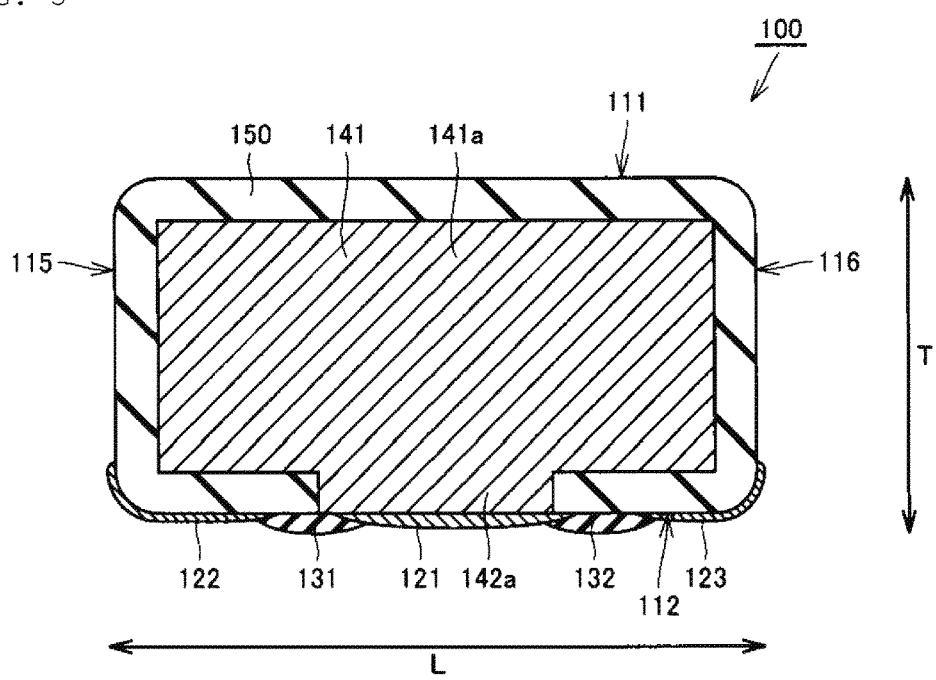
FIG. 5 is a cross-sectional view along line V-V shown in FIG. 3.
Figure 6:
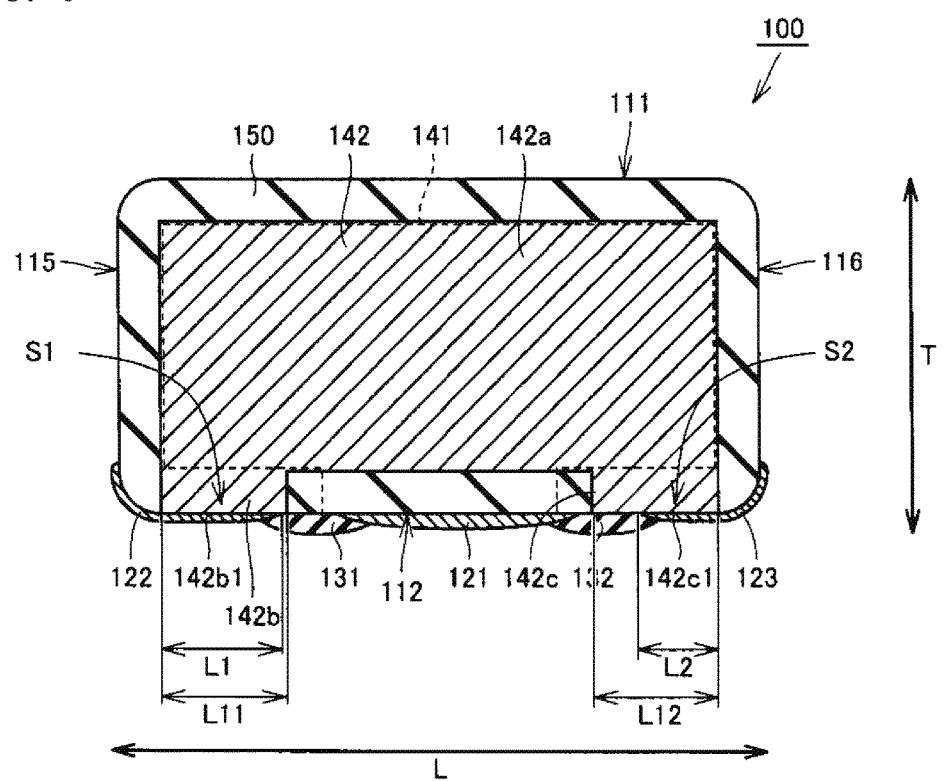
FIG. 6 is a cross-sectional view along line VI-VI shown in FIG. 3.

FIG. 1 is a perspective view of a multilayer ceramic capacitor according to a first preferred embodiment of the present invention. FIG. 2 is a diagram illustrating a side including a second principal surface of the multilayer ceramic capacitor according to the first preferred embodiment. FIG. 3 is a cross-sectional view along line III-III shown in FIG. 1. FIG. 4 is a cross-sectional view along line IV-IV shown in FIG. 1. FIG. 5 is a cross-sectional view along line V-V shown in FIG. 3. FIG. 6 is a cross-sectional view along line VI-VI shown in FIG. 3. A multilayer ceramic capacitor 100 according to the present preferred embodiment will be described with reference to FIGS. 1 through 6.

As shown in FIGS. 1 through 4, the multilayer ceramic capacitor 100 according to the present preferred embodiment of the present invention includes a laminated body 110, a first external electrode 121, a pair of second external electrodes 122, 123, and a pair of insulating coating portions 131, 132.

The laminated body 110 preferably has a cuboid or substantially cuboid outer shape. The laminated body 110 includes a plurality of dielectric layers 150 and a plurality of internal electrode layers 140 that are laminated. The laminated body 110 includes a first side surface 113 and a second side surface 114 opposite to each other in a laminating direction W, a first principal surface 111 and a second principal surface 112 (see FIG. 5) opposite to each other in a height direction T perpendicular or substantially perpendicular to the laminating direction W, and a first end surface 115 and a second end surface 116 opposite to each other in a length direction L perpendicular or substantially perpendicular to both the laminating direction W and the height direction T.

The laminated body 110 preferably has the substantially cuboid outer shape as mentioned above, but preferably includes rounded corners and ridges. The corner refers to the intersection of three surfaces of the laminated body 110, and the ridge refers to the intersection of two surfaces of the laminated body 110. At least one of the first principal surface 111, second principal surface 112, first side surface 113, second side surface 114, first end surface 115, and second end surface 116 may include an asperity or asperities.

As for the outside dimensions of the multilayer ceramic capacitor 100, for example, preferably the dimension in the length direction L is about 2.0 mm or more and about 2.3 mm or less, the dimension in the width direction W is about 1.2 mm or more and about 1.55 mm or less, and the dimension in the laminating direction W is about 0.5 mm or more and about 1.0 mm or less. The outside dimensions of the multilayer ceramic capacitor 100 may be measured with a micrometer.

The laminated body 110 is segmented into a pair of outer layer portions and an inner layer portion in the laminating direction W. One of the pair of outer layer portions is a portion including the first side surface 113 of the laminated body 110, and including a dielectric layer 150 located between the first side surface 113 and a first internal electrode layer 141 closest to the first side surface 113 as will be described later. The other of the pair of outer layer portions is a portion including the second side surface 114 of the laminated body 110, and including a dielectric layer 150 located between the second side surface 114 and a second internal electrode layer 142 closest to the second side surface 114 as will be described later.

The inner layer portion is a region sandwiched between the pair of outer layer portions. More specifically, the inner layer portion includes a plurality of dielectric layers 150 that do not define the outer layer portions, and all of the internal electrode layers 140.

The number of the plurality of dielectric layers 150 laminated is preferably 20 or more and 1100 or less, for example. The pair of outer layer portions is each preferably about 10 μm or more and about 80 μm or less in thickness, for example. The plurality of dielectric layers 150 included in the inner layer portion are each preferably about 0.4 μm or more and about 3 μm or less in thickness, for example.

The dielectric layers 150 are preferably made of a perovskite-type compound containing Ba or Ti, for example.

Dielectric ceramics containing, as their main constituent, $BaTiO_3$, $CaTiO_3$, $SrTiO_3$, $CaZrO$, or other suitable ceramic can be used as a material of the dielectric layers 150. In addition, materials may be used where the foregoing main constituents have a Mn compound, a Mg compound, a Si compound, a Fe compound, a Cr compound, a Co compound, a Ni compound, an Al compound, a V compound, a rare-earth compound, or other suitable material added thereto as an accessory constituent.

As shown in FIGS. 3 and 4, the plurality of internal electrode layers 140 include a plurality of first internal electrode layers 141 connected to the first external electrode 121; and a plurality of second internal electrode layers 142 connected to each of the pair of second external electrodes 122, 123.

The number of the plurality of internal electrode layers 140 laminated is preferably 10 or more and 1100 or less, for example. The plurality of internal electrode layers 140 are each preferably about 0.3 μm or more and about 1.0 μm or less in thickness, for example. The coverage for each of the plurality of internal electrode layers 140 covering the dielectric layers 150 without any space is preferably about 50% or more and about 95% or less, for example.

The material of the internal electrode layers 140 is preferably composed of one metal selected from the group consisting of Ni, Cu, Ag, Pd, and Au, or an alloy containing the metal, and for example, an alloy of Ag and Pd can be used. The internal electrode layers 140 may include dielectric grains of the same composition as the dielectric ceramic included in the dielectric layers 150.

The first internal electrode layers 141 and the second internal electrode layers 142 are alternately disposed at regular intervals in the laminating direction W of the laminated body 110. In addition, the first internal electrode layers 141 and the second internal electrode layers 142 are opposed to each other with the dielectric layers 150 interposed therebetween.

The dielectric layers 150 are located between opposed electrode portions 141a (see FIG. 5) of the first internal electrode layers 141 as will be described later and opposed electrode portions 142a (see FIG. 6) of the second internal electrode layer 142 as will be described later, thus providing an electrostatic capacitance. Thus, the function of a capacitor is achieved.

It is to be noted that details of the first internal electrode layers 141 and second internal electrode layers 142 will be described later with reference to FIGS. 4 and 5.

The first external electrode 121 is provided on the second principal surface 112. Specifically, the first external electrode 121 extends in the laminating direction W in a central portion of the second principal surface 112 in the length direction L, over from the second principal surface 112 to respective portions of the first side surface 113 and second side surface 114.

It is to be noted that the first external electrode 121 may be extended over from the second principal surface 112 to a portion of at least one of the first side surface 113 and the second side surface 114.

The pair of second external electrodes 122, 123 is provided on the second principal surface 112. The pair of second external electrodes 122, 123 is provided on both ends of the second principal surface 112 in the length direction L, such that the first external electrode 121 is located between the second external electrodes.

One second external electrode 122 of the pair of second external electrodes 122, 123 extends in the laminating direction W on an end of the second principal surface 112 in the length direction L, over from the second principal surface 112 to respective portions of the first side surface 113, second side surface 114, and first end surface 115.

It is to be noted that the second external electrode 122 may extend only over from the second principal surface 112 to a portion of at least one of the first side surface 113 and the second side surface 114, and to a portion of the first end surface 115.

The other second external electrode 123 of the pair of second external electrodes 122, 123 extends in the laminating direction W on the other end of the second principal surface 112 in the length direction L, over from the second principal surface 112 to respective portions of the first side surface 113, second side surface 114, and second end surface 116.

It is to be noted that the second external electrode 123 may only extend over from the second principal surface 112 to a portion of at least one of the first side surface 113 and the second side surface 114, and to a portion of the second end surface 116.

The first external electrode 121 and the pair of second external electrodes 122, 123 each include a base electrode layer, and a plated layer disposed on the base electrode layer. The base electrode layer preferably includes at least one of a baked layer and a thin film layer, for example. The base electrode layer is preferably about 10 μm or more and about 100 μm or less in thickness.

The baked layer includes glass and a metal. The material of the baked layer is preferably composed of one metal selected from the group consisting of Ni, Cu, Ag, Pd, and Au, or an alloy containing the metal, and for example, an alloy of Ag and Pd may be used. The baked layer may include a plurality of layers that are laminated. The baked layer may be a layer obtained by applying a conductive paste to the laminated body 110 and baking the paste, or a layer subjected to co-firing with the internal electrode layers 140, for example.

A resin layer includes conductive particles and a thermosetting resin. When the resin layer is provided, the resin layer may be provided directly on the laminated body 110 without providing any baked layer. The resin layer may include a plurality of layers laminated. The resin layer is preferably about 10 μm or more and about 150 μm or less in thickness, for example.

The thin film layer is formed by a thin-film formation method, such as a sputtering method or a vapor deposition method, for example. The thin film layer is a layer of about 1 μm or less that includes deposited metal particles.

The material of the plated layer is preferably composed of one metal selected from the group consisting of Ni, Cu, Ag, Pd, and Au, or an alloy containing the metal, and for example, an alloy of Ag and Pd may be used.

The plated layer may include a plurality of layers laminated. In this case, the plated layer preferably has a two-layer structure including a Sn plated layer formed on a Ni plated layer, for example. The Ni plated layer prevents the base electrode layer from being eroded by solder used to mount the ceramic electronic component. The Sn plated layer improves the wettability to the solder used to mount the ceramic electronic component, so as to facilitate mounting of the ceramic electronic component. The plated layers are preferably about 1.0 μm or more and about 10.0 μm or less in thickness per layer, for example.

The pair of insulating coating portions 131, 132 fills, on the second principal surface 112, gaps between each of the pair of second external electrodes 122, 123 and the first external electrode 121.

One insulating coating portion 131 of the pair of insulating coating portions 131, 132 fills the gap between the second external electrode 122 and the first external electrode 121. The insulating coating portion 131 extends in the laminating direction W, over from the second principal surface 112 to respective portions of the first side surface 113 and second side surface 114. It is to be noted that the insulating coating portion 131 may extend over from the second principal surface 112 to a portion of at least one of the first side surface 113 and the second side surface 114. In this case, the insulating coating portion 131 is provided on the first side surface 113 or the second side surface 114 on which the pair of second external electrodes 122, 123 is each provided.

The other insulating coating portion 132 of the pair of insulating coating portions 131, 132 fills the gap between the second external electrode 123 and the first external electrode 121. The insulating coating portion 132 extends in the laminating direction W, over from the second principal surface 112 to respective portions of the first side surface 113 and second side surface 114. It is to be noted that the insulating coating portion 132 may extend over from the second principal surface 112 to a portion of at least one of the first side surface 113 and the second side surface 114. In this case, the insulating coating portion 132 is provided on the first side surface 113 or the second side surface 114 on which the pair of second external electrodes 122, 123 is each provided.

The insulating coating portions 131, 132 are preferably about 10 µm or more and about 150 µm or less, for example. A dielectric ceramic, a resin, or glass may be used as a material of the insulating coating portions 131, 132. In the case of using a dielectric ceramic as a material of the insulating coating portions 131, 132, $BaTiO_3$, $CaTiO_3$, $SrTiO_3$, $CaZrO_3$, or other suitable ceramic may preferably be used as a main constituent, for example. In addition, the foregoing main constituents may have a Mn compound, a Mg compound, a Si compound, a Fe compound, a Cr compound, a Co compound, a Ni compound, an Al compound, a V compound, a rare-earth compound, or other suitable material added thereto as an accessory constituent.

The insulating coating portions 131, 132 may be provided, for example, by applying ceramic dielectric slurry to the laminated body 110 and firing the slurry, or provided by co-firing simultaneously with a laminated chip as will be described later.

In the case of using a resin as a material of the insulating coating portions 131, 132, a resin is used which preferably includes an epoxy-based resin or a polyimide-based resin, for example. In this case, the insulating coating portions 131, 132 are provided by applying a resin paste to the laminated body 110, and thermally hardening the paste, for example.

In the case of using glass as a material of the insulating coating portions 131, 132, preferably glass containing Ba or Sr, for example, is used. In this case, the insulating coating portions 131, 132 are provided by applying a glass paste to the laminated body 110, and baking the paste, for example.

As shown in FIG. 5, the first internal electrode layers 141 each include an opposed electrode portion 141a opposite to the second internal electrode layer 142, and an extended electrode portion 141b extended from the opposed electrode portion 141a to the second principal surface 112 of the laminated body 110. The extended electrode portion 141b of the first internal electrode layer 141 is extended to a central portion of the second principal surface 112 in the length direction L. The extended electrode portion 141b is connected to the first external electrode 121.

An end of the extended electrode portion 141b closer to the first end surface 115 extends to the first end surface 115 from the region with the first external electrode 121 provided on the second principal surface 112, so as not to come into contact with the second external electrode 122. The end of the extended electrode portion 141b, protruded from the first external electrode 121, is covered with the insulating coating portion 131. Thus, the extended electrode portions 141b are prevented from being exposed to the outside. It is to be noted that the end of the extended electrode portion 141b, which is located closer to the first end surface 115, may be covered with the first external electrode 121. The extended electrode portion 141b closer to the second end surface 116 is located within the region with the first external electrode 121 provided on the second principal surface 112.

As shown in FIG. 6, the second internal electrode layers 142 each include an opposed electrode portion 142a opposite to the opposed electrode portion 141a of the first internal electrode layer 141, and a first extended electrode portion 142b and a second extended electrode portion 142c extended from the opposed electrode portion 142a to the second principal surface 112 of the laminated body 110.

The first extended electrode portion 142b is connected to the second external electrode 122. An end 142b1 of the first extended electrode portion 142b closer to the second end surface 116 at the second principal surface 112 extends to the second end surface 116 from the region with the second external electrode 122 provided on the second principal surface 112, so as not to come into contact with the first external electrode 121.

The end of the first extended electrode portion 142b, protruded from the second external electrode 122, is covered with the insulating coating portion 131. Thus, the first extended electrode portions 142b are prevented from being exposed to the outside.

The second extended electrode portion 142c is connected to the second external electrode 123. An end 142c1 of the second extended electrode portion 142c closer to the first end surface 115 at the second principal surface 112 extends to the first end surface 115 from the region with the second external electrode 123 provided on the second principal surface 112, so as not to come into contact with the first external electrode 121.

The end of the second extended electrode portion 142c, protruded from the second external electrode 123, is covered with the insulating coating portion 132. Thus, the second extended electrode portions 142c is prevented from being exposed to the outside.

As shown in FIGS. 5 and 6, the pair of insulating coating portions 131, 132 includes overlapping portions overlapping with respective portions of the first external electrode 121 and pair of second external electrodes 122, 123 in the length direction L. The overlapping portions of the pair of insulating coating portions 131, 132 cover the respective portions of the first external electrode 121 and pair of second external electrodes 122, 123.

Specifically, an end of the insulating coating portion 131, which is closer to the first end surface 115, covers an end of the second external electrode 122, which is closer to the second end surface 116, and an end of the insulating coating portion 131, which is closer to the second end surface 116, covers an end of the first external electrode 121, which is closer to the first end surface 115.

An end of the insulating coating portion 132, which is closer to the first end surface 115, covers an end of the first external electrode 121, which is closer to the second end surface 116, and an end of the insulating coating portion 132, which is closer to the second end surface 116, covers an end of the second external electrode 123, which is closer to the first end surface 115.

As mentioned above, the overlapping portions of the pair of insulating coating portions 131, 132 cover the respective portions of the first external electrode 121 and pair of second external electrodes 122, 123, thus to prevent the first external electrode 121 and the pair of second external electrodes 122, 123 from being peeled from the laminated body 110.

In addition, a maximum thickness of the pair of insulating coating portions 131, 132 on the second principal surface 112 is larger than a maximum thickness of the first external electrode 121 on the second principal surface 112, a maximum thickness of the second external electrode 122 thereon, and a maximum thickness of the second external electrode 123 thereon.

It is to be noted that the maximum thickness of the first external electrode 121, the maximum thickness of the pair of second external electrodes 122, 123, and the maximum thickness of the pair of insulating coating portions 131, 132 are each measured as follows. First, the multilayer ceramic capacitor 100 is polished to a central location in the laminating direction W to expose a cross section perpendicular or substantially perpendicular to the laminating direction W. The exposed cross section is observed with a microscope, a scanning microscope, or other suitable instrument for measurement. For at least five electronic components, the various types of maximum thicknesses mentioned above are each measured, and the respective average values are calculated as the maximum thickness of the first external electrode 121, the maximum thickness of the pair of second external electrodes 122, 123, and the maximum thickness of the pair of insulating coating portions 131, 132.

In addition, the length L1 of the first contact portion S1 with the second external electrode 122 in contact with the first extended electrode portion 142b as will be described later in the length direction L (see FIG. 6) and the length L2 of the second contact portion S2 with the second external electrode 123 in contact with the second extended electrode portion 142c as will be described later in the length direction L (see FIG. 6) are also measured in the same or similar way as described above. Specifically, the multilayer ceramic capacitor 100 is polished to a central location in the laminating direction W, to expose a cross section perpendicular or substantially perpendicular to the laminating direction W. The exposed cross section is observed with a microscope, a scanning microscope, or other suitable instrument for measurement. For at least five electronic components, the L1 and L2 mentioned above are each measured, and the respective average values are calculated as L1 and L2.

As shown in FIG. 6, a length L11 of the end 142b1 of the first extended electrode portion 142b extended to the second principal surface 112 in the length direction L is equal to or substantially equal to a length L12 of the end 142c1 of the second extended electrode portion 142c extended to the second principal surface 112 in the length direction, and on the second principal surface 112, a length of one second external electrode 122 in the length direction is larger than a length of the other second external electrode 123 in the length direction.

Thus, the length L1 of the first contact portion S1 with the second external electrode 122 in contact with the first extended electrode portion 142b in the length direction L is larger than the length L2 of the second contact portion S2 with the second external electrode 123 in contact with the second extended electrode portion 142c in the length direction L. More specifically, the relationship of $L1/L2>1.0$ is preferably satisfied.

With the relationship of $L1/L2>1.0$ satisfied, an area of contact between the first extended electrode portion 142b and the second external electrode 122 at the first contact portion S1 is larger than an area of contact between the second extended electrode portion 142c and the second external electrode 123 at the second contact portion S2. Thus, the electrical resistance of a current flowing through the first extended electrode portion 142b to the second external electrode 122 is smaller than the electrical resistance of a current flowing through the second extended electrode portion 142c to the second external electrode 123.

As described above, the electrical resistance is adjusted to differ between the side with one second external electrode 122 and the side with the other second external electrode 123, and thus, in a mounted structure with the multilayer ceramic capacitor 100 and an integrated circuit, such as an IC mounted on a multilayer wiring substrate, as will be described later, the current flowing from a power supply 250 to the ground passes primarily through the side with the second external electrode 123 as a higher resistance side, rather than the side with the second external electrode 122 as a lower resistance side, and is extracted from the first external electrode 121 at frequencies around the antiresonant frequency. Thus, the power impedance is able to be lowered at frequencies around the antiresonant frequency.

It is to be noted that the L1 and L2 mentioned above preferably satisfies the relationship of $L1/L2 \geq 1.2$, more preferably satisfies the relationship of $L1/L2 \geq 1.4$, further preferably satisfies the relationship of $L1/L2 \geq 1.6$, for example.

As the ratio of L1/L2 is increased, the electrical resistance of a current flowing through the second extended electrode portion 142c to the second external electrode 123 is much larger than the electrical resistance of a current flowing through the first extended electrode portion 142b to the second external electrode 122.

Thus, the power impedance at the antiresonant frequency is able to be further reduced as compared with a case where the side with the second external electrode 122 is equal in resistance to the side with the second external electrode 123.

Figure 7:
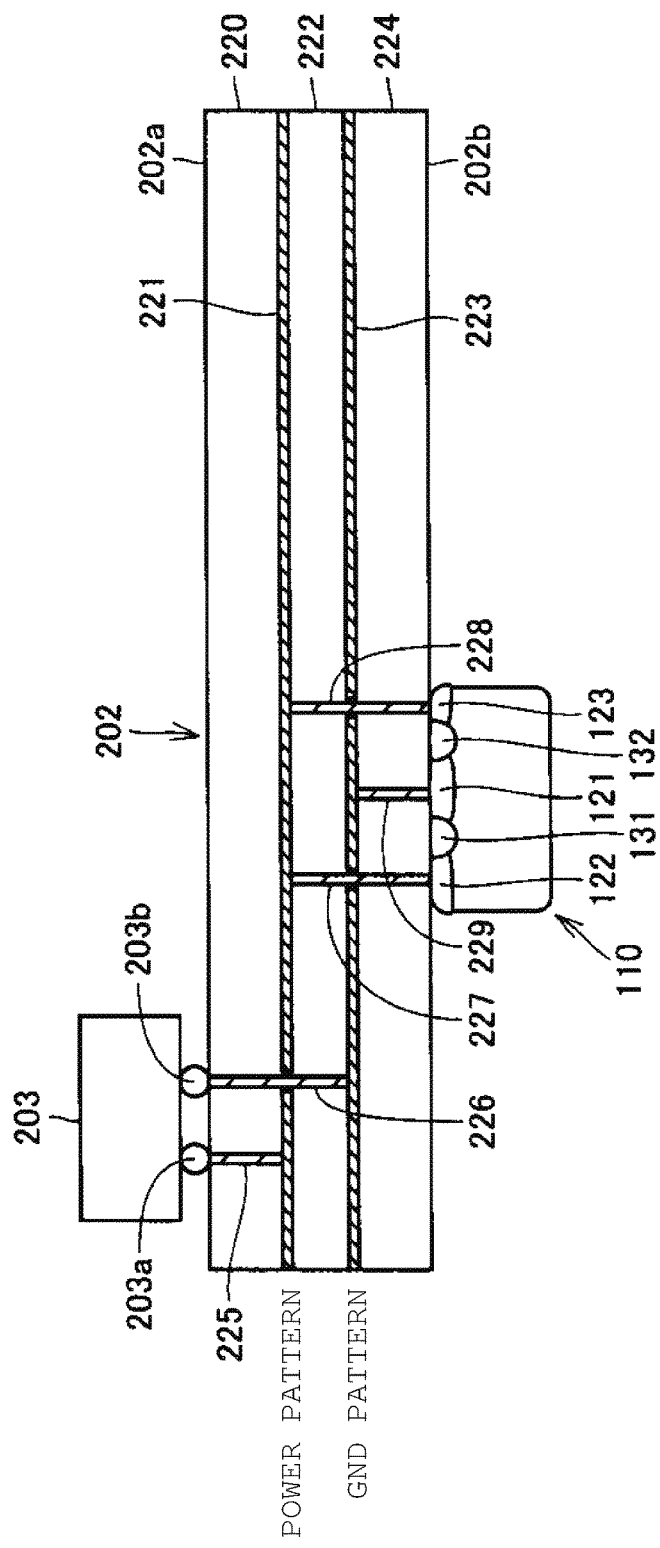
FIG. 7 is a diagram illustrating the mounted structure of an electronic component including a multilayer ceramic capacitor according to a preferred embodiment of the present invention mounted.

FIG. 7 is a diagram illustrating the mounted structure of an electronic component with the multilayer ceramic capacitor according to a preferred embodiment of the present invention mounted. As shown in FIG. 7, a mounted structure 200 includes a multilayer wiring substrate 202, an IC 203, and the multilayer ceramic capacitor 100.

The multilayer wiring substrate 202 has a laminated structure including an insulating layer 220, a power plane 221, an insulating layer 222, a ground plane 223, and an insulating layer 224 that are laminated. The multilayer wiring substrate 202 includes, as inner layers, the power plane 221 and the ground plane 223 provided to sandwich the insulating layer 222 therebetween.

The insulating layers 220, 222, 224 are each, for example, a rectangular or substantially rectangular thin sheet made of an insulating resin, ceramic, or other suitable material. The power plane 221 is made of a conductive pattern of copper foil or other suitable material, for example. The ground plane 223 is made of, for example, a conductive pattern of copper foil or other suitable material. Capacitance is produced between the power plane 221 and the ground plane.

On one surface 202a of the multilayer wiring substrate 202, for example, a printed wiring of copper foil or other suitable material is provided, and an integrated circuit, such as the IC 203, is mounted. The IC 203 is, for example, an IC in a Ball Grid Array (BGA) package, which is mounted on the surface 202a of the multilayer wiring substrate 202 by face-down mounting with the use of ball-shaped electrodes (bumps).

The IC 203 includes a power supply terminal 203a connected to the power plane 221 through a first via 225 to pass through the insulating layer 220 in the thickness direction. The IC 203 includes a ground terminal 203b connected to the ground plane 223 through a second via 226 to pass through the insulating layer 220 and the insulating layer 222 in the thickness direction. Capacitance is produced within the IC.

On the other surface 202b of the multilayer wiring substrate 202, for example, a printed wiring of copper foil or other suitable material is provided, and the multilayer ceramic capacitor 100 is mounted by soldering or other suitable process.

The first external electrode 121 of the multilayer ceramic capacitor 100 is connected to the ground plane 223 through a third via 227 to pass through the insulating layer 224 in the thickness direction.

The second external electrode 122 of the multilayer ceramic capacitor 100 is connected to the power plane 221 through a fourth via 228 to pass through the insulating layer 224 and the insulating layer 222. The second external electrode 123 of the multilayer ceramic capacitor 100 is connected to the power plane 221 through a fifth via 229 to pass through the insulating layer 224 and the insulating layer 222.

Figure 8:
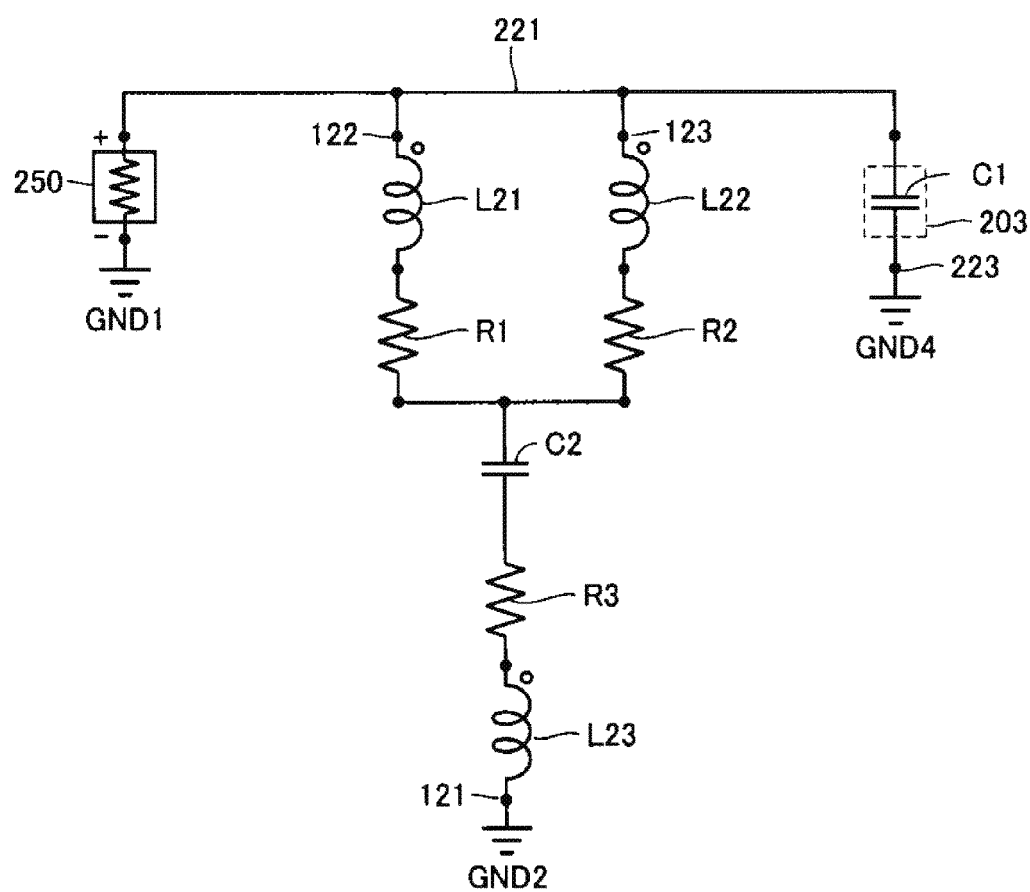
FIG. 8 is a diagram illustrating an equivalent circuit corresponding to the mounted structure of the electronic component shown in FIG. 7.

FIG. 8 is a diagram illustrating an equivalent circuit corresponding to the mounted structure of the electronic component, shown in FIG. 7. It is to be noted that the inductance of the third via 227 and fourth via 228 has no influence on antiresonance, and the via holes are thus omitted in FIG. 8.

As shown in FIG. 8, a capacitance C2 is provided within the multilayer ceramic capacitor 100 in the equivalent circuit corresponding to the mounted structure 200. The capacitance C2 is preferably, for example, on the order of about 20 nF.

A series circuit of a resistance R22 and an inductance L22 is connected between the capacitance C2 and the second external electrode 122. In addition, a series circuit of a resistance R23 and an inductance L23 is connected between the capacitance C2 and the second external electrode 123. A series circuit of a resistance R21 and an inductance L21 is connected between the capacitance C2 of the multilayer ceramic capacitor 100 and the ground electrode (GND2).

The second external electrode 122 and the second external electrode 123 are connected to the power plane 221 connected to the power supply 250. The IC 203 connected to the power plane 221 and the ground plane 223 produce a capacitance C1. The capacitance C1 is preferably, for example, on the order of about 30 nF to about 100 nF.

As described above, the length L1 of the first contact portion S1 with the second external electrode 122 in contact with the first extended electrode portion 142b in the length direction L is larger than the length L2 of the second contact portion S2 with the second external electrode 123 in contact with the second extended electrode portion 142c in the length direction L, thus making the resistance R22 lower than the resistance R21.

As described above, the resistances R22, R23 are different between the side with the second external electrode 122 and the side with the second external electrode 123, and thus, the current flowing from the power supply 250 to the ground passes through the side with the second external electrode 122 as a lower resistance side, and is extracted from the first external electrode 121 to flow to the ground plane 223 at frequencies (including the resonant frequency) around the antiresonant frequency.

On the other hand, the current flowing from the power supply 250 to the ground passes through the side with the second external electrode 123 as a higher resistance side, and is extracted from the first external electrode 121 to flow to the ground plane 223 at frequencies around the antiresonant frequency.

Thus, the power impedance at the antiresonant frequency is able to be reduced as compared with a case where the side with the second external electrode 122 is equal in resistance to the side with the second external electrode 123.

Figure 9:
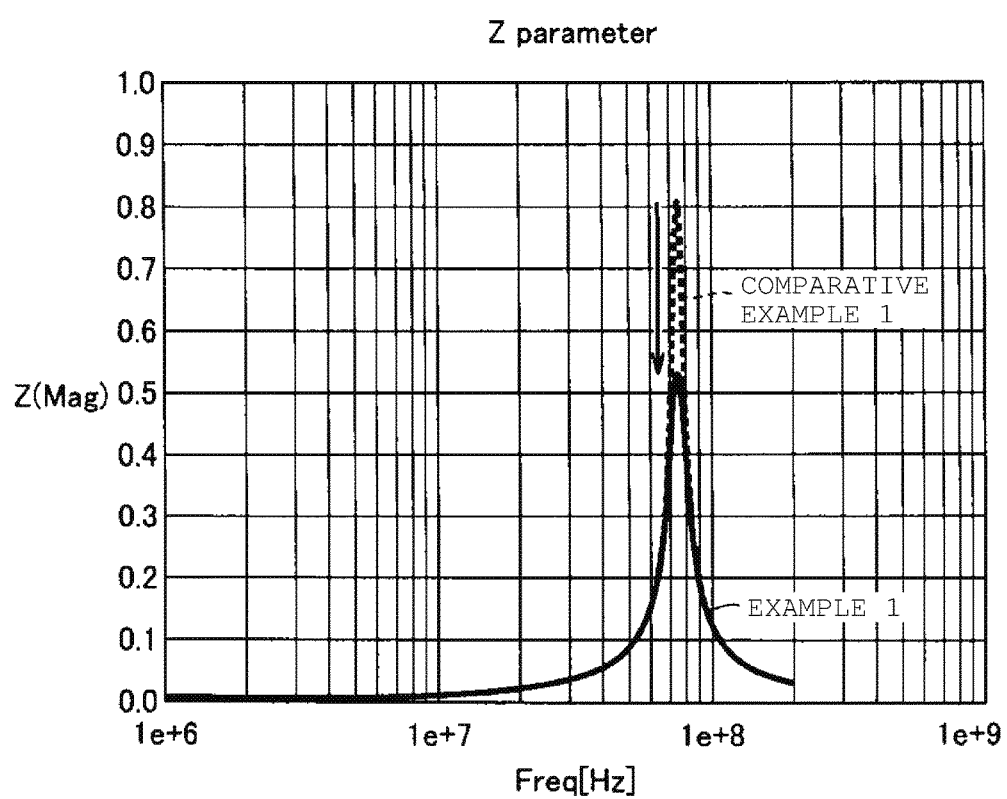
FIG. 9 is a diagram showing power impedance characteristics of the mounted structure of the electronic component shown in FIG. 7.

FIG. 9 is a diagram showing power impedance characteristics of the mounted structure of the electronic component, shown in FIG. 7. In FIG. 9, power impedance characteristics according to Example 1 are indicated by a solid line, and power impedance characteristics according to Comparative Example 1 are indicated by a dashed line.

As Example 1, a mounted structure was configured using the multilayer ceramic capacitor 100 according to the first preferred embodiment. According to Example 1, the inductance L21, the inductance L22, and the inductance L23 shown in the equivalent circuit of FIG. 8 were set to be about 100 pH. The capacitance C1 was set to be about 30 nF, and the capacitance C2 was set to be about 20 nF. The resistance R21 was set to be about 4 mΩ. Hereinafter, the resistances R21 to R23 have estimates obtained by back calculations from the impedance of the antiresonance through the application thereof to a simplified equivalent circuit.

In addition, the length L1 of the first contact portion S1 with the second external electrode 122 in contact with the first extended electrode portion 142b in the length direction L and the length L2 of the second contact portion S2 with the second external electrode 123 in contact with the second extended electrode portion 142c in the length direction L were set to have the relationship of L1/L2>1.0, more specifically, L1/L2=9. In this case, the resistance R22 was about 2.22 mΩ, and the resistance R23 was about 20 mΩ.

As Comparative Example 1, a mounted structure was configured with the use of a multilayer ceramic capacitor having a different relationship between the length L1 and the length L2 as compared with the first preferred embodiment. The remaining configuration is substantially the same as in Example 1. According to Comparative Example 1, the capacitor was used in which the length L1 was equal to or substantially equal to the length L2, and the relationship of L1/L2=1 was satisfied.

As shown in FIG. 9, in Example 1, the power impedance at the antiresonant frequency was substantially reduced by approximately 30%, as compared with Comparative Example 1. As described above, it has been confirmed that the relationship between L1 and L2 is set to be L1/L2>1.0, thus making it possible to reduce the power impedance at the antiresonance frequency.

Figure 10:
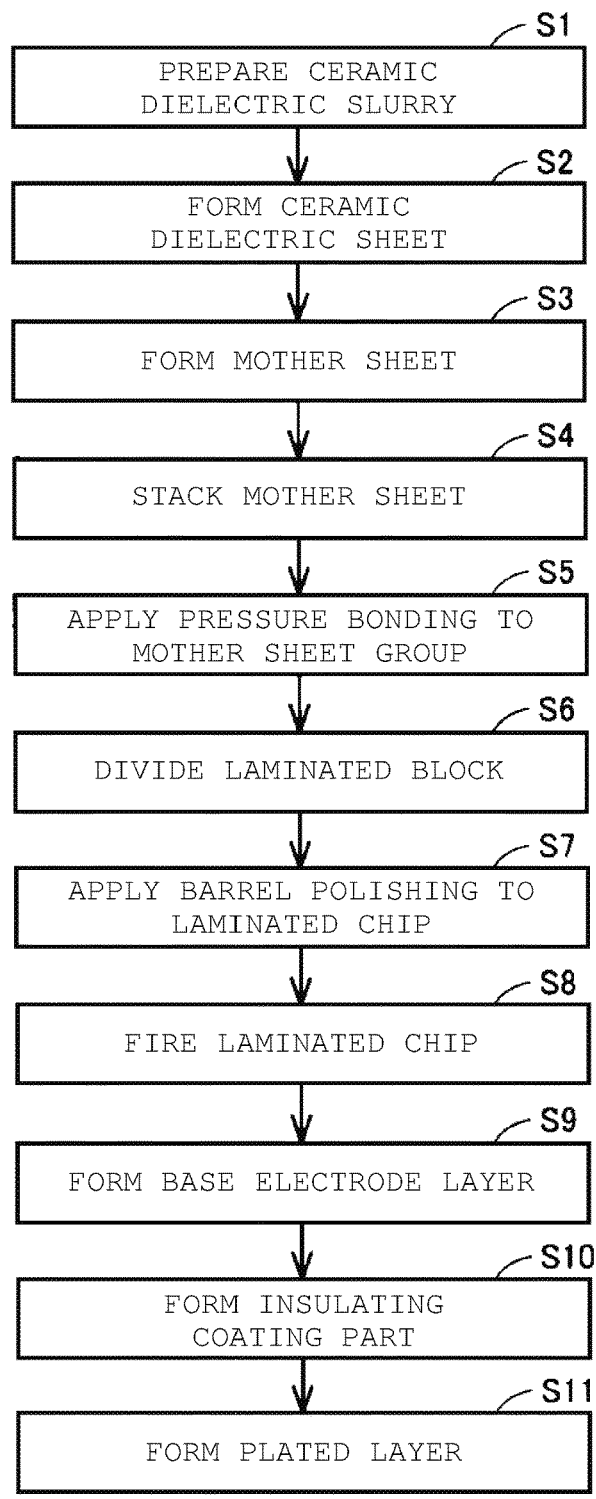
FIG. 10 is a flow diagram showing a method for manufacturing the multilayer ceramic capacitor according to a preferred embodiment of the present invention.

A method for manufacturing the multilayer ceramic capacitor 100 according to a preferred embodiment of the present invention will be described below with reference to the drawings. FIG. 10 is a flow diagram showing a method for manufacturing the multilayer ceramic capacitor according to a preferred embodiment of the present invention.

As shown in FIG. 10, for manufacturing the multilayer ceramic capacitor 100 according to a preferred embodiment of the present invention, first, ceramic dielectric slurry is prepared (step S1). Specifically, a ceramic dielectric powder, an additive powder, a binder resin, a dissolution liquid, and other ingredients are dispersed and mixed, thus preparing ceramic dielectric slurry. The ceramic dielectric slurry may be solvent-based or water-based slurry. When the ceramic dielectric slurry is made a water-based coating, the ceramic dielectric slurry is prepared by mixing a water-soluble binder, a dispersant, and other ingredients, and a dielectric raw material dissolved in water.

Next, ceramic dielectric sheets are formed (step S2). Specifically, the ceramic dielectric slurry is formed, on a carrier film, into a sheet using a die coater, a gravure coater, or other suitable device, and dried, thus forming ceramic dielectric sheets. The ceramic dielectric sheet is preferably about 3 μm or less in thickness, for example, in order to reduce the size of and increase the capacitance of, the multilayer ceramic capacitor 100.

Next, mother sheets are formed (step S3). Specifically, a conductive paste is applied to the ceramic dielectric sheets so as to provide predetermined patterns to form mother sheets with predetermined internal electrode patterns provided on the ceramic dielectric sheets. A screen printing method, an ink-jet method, a gravure printing method, or other suitable methods may be used as a method to apply the conductive paste. The internal electrode pattern is preferably about 1.5 μm or less in thickness, for example, to reduce the size of and increasing the capacitance of the multilayer ceramic capacitor 100. Further, as mother sheets, the ceramic dielectric sheets obtained without undergoing the step S3 mentioned above are also prepared in addition to the mother sheets including the internal electrode patterns.

Next, a plurality of mother sheets are stacked (step S4). Specifically, a predetermined number of mother sheets is stacked which are each composed of only a ceramic dielectric sheet without any internal electrode pattern formed thereon. A predetermined number of mother sheets provided with the internal electrode patterns is stacked thereon. Furthermore, a predetermined number of mother sheets is stacked thereon which are each composed of only a ceramic dielectric sheet without any internal electrode pattern formed thereon. Thus, a group of mother sheets is configured.

Next, the group of mother sheets is subjected to pressure bonding, thus forming a laminated block (step S5). Specifically, the group of mother sheets is subjected to pressure bonding by applying a pressure to the group in the stacking direction through isostatic press or rigid press, thus forming the laminated block.

Next, the laminated block is divided to form laminated chips (step S6). Specifically, the laminated block is divided into a matrix by cutting by pushing, cutting with a dicing machine, or laser cutting, for example, in order to provide a plurality of individual laminated chips.

Next, the laminated chip is subjected to barrel polishing (step S7). Specifically, the laminated chips are encapsulated in a small box referred to as a barrel, along with media balls that have a higher hardness than the dielectric material, and the barrel is rotated, in order to polish the laminated chips. Thus, the laminated chips preferably include rounded corners and ridges.

Next, the laminated chip is subjected to firing (step S8). Specifically, the laminated chip is heated so as to fire the dielectric material and conductive material included in the laminated chip. Thus, the laminated body 110 is formed which includes the plurality of dielectric layers 150 and the plurality of internal electrode layers 140. The firing temperature is set appropriately depending on the dielectric material and the conductive material, and preferably about 900° C. or higher and about 1300° C. or lower, for example.

Next, a conductive paste is applied to the surface of the laminated body 110. According to the present preferred embodiment, the conductive paste is applied to the surface of the laminated body 110 by a roller transfer method. However, the method to apply the conductive paste is not limited to the roller transfer method, but may be a spray coating method or a dip method, for example.

Figure 11:
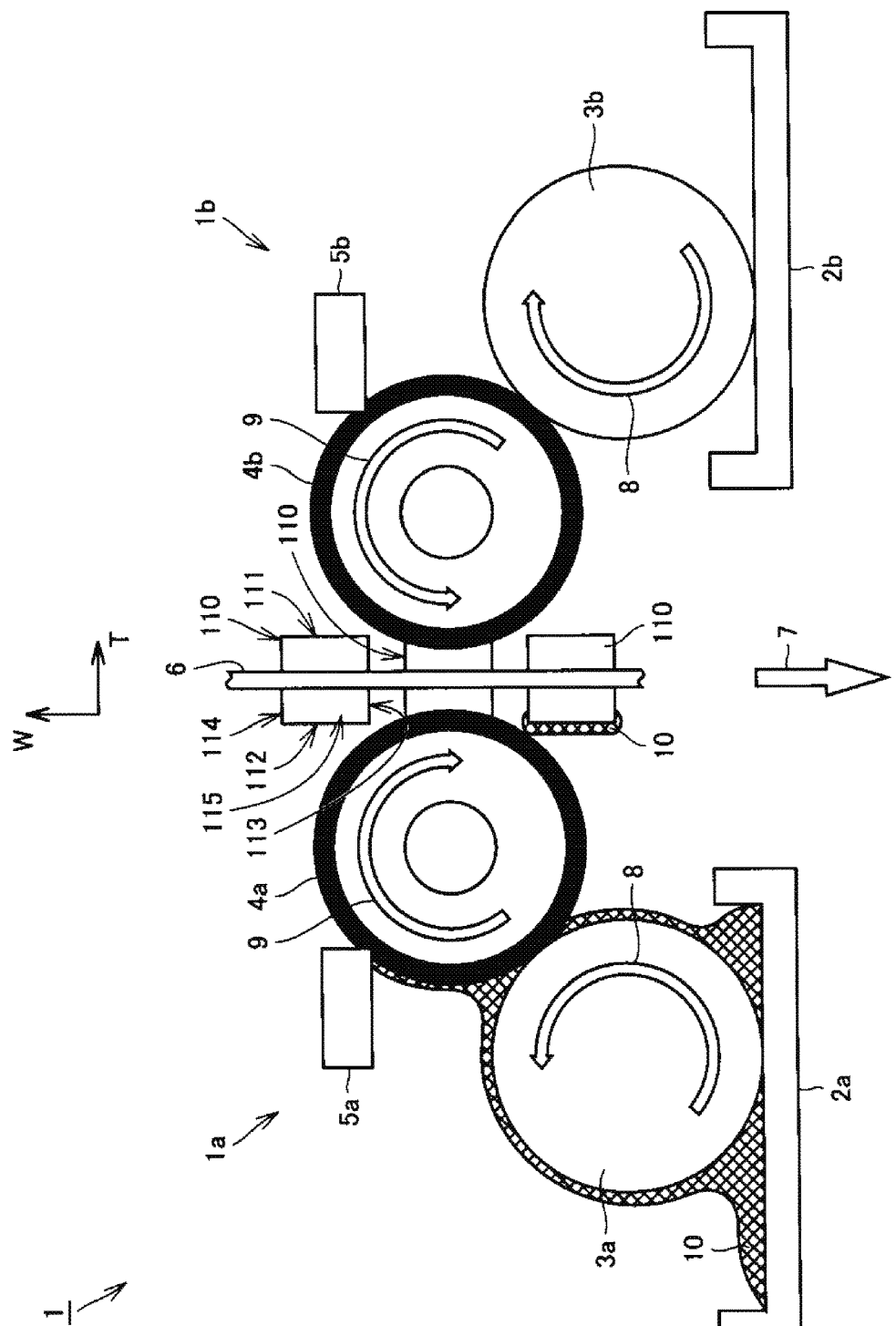
FIG. 11 is a diagram illustrating the configuration of an application system to apply a conductive paste to a laminated body of the multilayer ceramic capacitor according to a preferred embodiment of the present invention.
Figure 12:
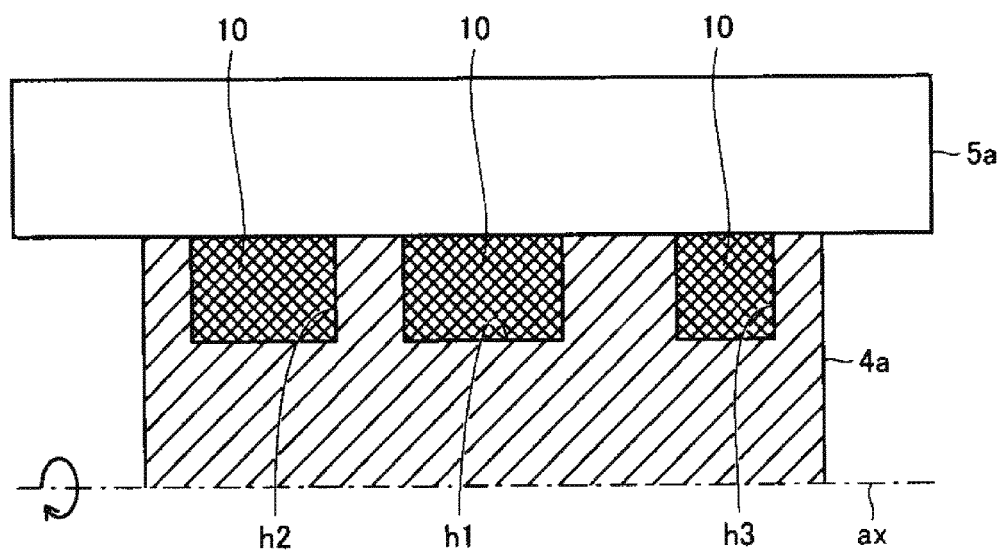
FIG. 12 is a cross-sectional view illustrating a first transfer roller and a first scraper in contact with each other in the application system shown in FIG. 11.

FIG. 11 is a cross-sectional view illustrating the configuration of an application system to apply a conductive paste to the laminated body of the multilayer ceramic capacitor according to a preferred embodiment of the present invention. FIG. 12 is a cross-sectional view illustrating a first transfer roller and a first scraper in contact with each other in the application system shown in FIG. 11.

As shown in FIGS. 11 and 12, the application system 1 includes a first application mechanism 1*a* and a second application mechanism 1*b* spaced apart from each other. The first application mechanism 1*a* includes a first container 2*a* that stores a conductive paste 10, a first supply roller 3*a* partially located in the first container 2*a*, a first transfer roller 4*a* in rolling contact with an outer peripheral surface of the first supply roller 3*a*, and a first scraper 5*a* in abutment with an outer peripheral surface of the first transfer roller 4*a*.

Likewise, the second application mechanism 1*b* includes a second container 2*b*, a second supply roller 3*b* partially located in the second container 2*b*, a second transfer roller 4*b* in rolling contact with an outer peripheral surface of the second supply roller 3*b*, and a second scraper 5*b* in abutment with an outer peripheral surface of the second transfer roller 4*b*. The second container 2*b* is not filled with the conductive paste 10.

The first transfer roller 4*a* and the second transfer roller 4*b* each include a cylindrical body, and an elastic portion that covers the outer periphery of the body. While the body is composed of iron, the material of the body is not limited to any iron, and may be made of other metals, or composite materials such as CFRP (Carbon Fiber Reinforced Plastics), for example. While the elastic portion is compose of a silicone rubber, the material of the elastic portion is not limited to any silicone rubber, and may be made of other rubbers that have moderate deformation resistance, for example.

The first transfer roller 4*a* and the second transfer roller 4*b* each rotate around a rotation axis ax. For each of the first transfer roller 4*a* and the second transfer roller 4*b*, the outer peripheral surface is provided with a first groove h1 and a pair of second grooves h2, h3 which are continuous annularly.

The first groove h1 is provided in a central portion in the direction of the rotation axis ax at the outer peripheral surface for each of the first transfer roller 4*a* and the second transfer roller 4*b*. The pair of second grooves h2, h3 is provided at both ends in the direction of the rotation axis ax at the outer peripheral surface for each of the first transfer roller 4*a* and the second transfer roller 4*b*.

A width of the first groove h1 is larger than a width for each of the pair of second grooves h2, h3. The width of one second groove h2 is larger than the width of the other second groove h3. The cross-sectional shape of the inside region for each of the first groove h1 and the pair of second grooves h2, h3 is rectangular or substantially rectangular, but not limited to the rectangular or substantially rectangular shape, and may be semi-circular, semi-elliptical, or other suitable shapes, for example.

The operation of the application system 1 to apply the conductive paste 10 to the laminated body 110 of the multilayer ceramic capacitor 100 will be described below. First, the first supply roller 3*a* and the second supply roller 3*b* are respectively rotated in directions opposite to each other as indicated by arrows 8. Thus, the conductive paste 10 in the first container 2*a* adheres to the outer peripheral surface of the first supply roller 3*a*.

In addition, the first transfer roller 4*a* and the second transfer roller 4*b* are respectively rotated in directions opposite to each other as indicated by arrows 9. The first transfer roller 4*a* comes into rolling contact with the first supply roller 3*a*. The second transfer roller 4*b* comes into rolling contact with the second supply roller 3*b*. Thus, the conductive paste 10 adhering to the outer peripheral surface of the first supply roller 3*a* is transferred to the outer surface of the first transfer roller 4*a*.

As shown in FIG. 12, the first scraper 5*a* in slide contact with the outer surface of the first transfer roller 4*a* fills the inside of the first groove h1 and the inside of the pair of second grooves h2, h3 with the conductive paste 10 transferred to the outer peripheral surface of the first transfer roller 4a, and scrapes off the excess paste.

Next, a plurality of laminated bodies 110 supported with a carrier tape 6 attached to each of first end surfaces 115 and second end surfaces 116 pass between the first transfer roller 4a and the second transfer roller 4b in the conveying direction indicated by an arrow 7, while being sequentially sandwiched between the first transfer roller 4a and the second transfer roller 4b. In this regard, the length direction L of the laminated body 110 and the direction of the rotation axis ax are parallel or substantially parallel, and the laminating direction W of the laminated body 110 and the conveying direction of the laminated body 110 are parallel or substantially parallel.

The conveying speed of the laminated body 110 is equal or substantially equal to the rotation speed of the outer periphery for each of the first transfer roller 4a and the second transfer roller 4b.

Figure 13:
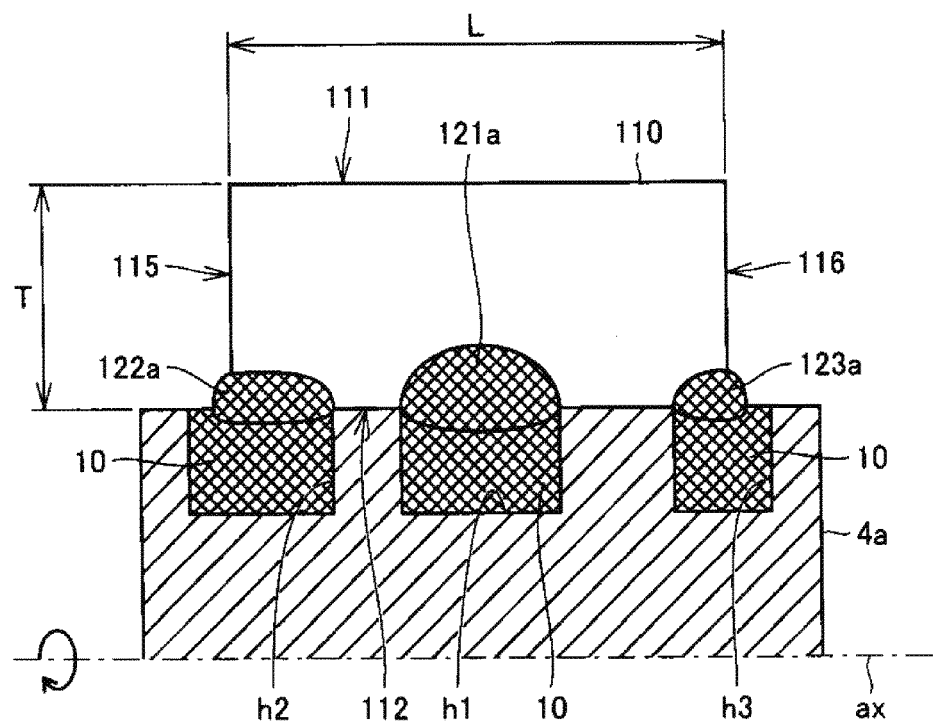
FIG. 13 is a cross-sectional view illustrating the first transfer roller and the laminated body in contact with each other in the application system shown in FIG. 11.

FIG. 13 is a cross-sectional view illustrating the first transfer roller and the laminated body in contact with each other in the application system shown in FIG. 11.

As shown in FIG. 13, the conductive paste 10 filling the inside of the first groove h1 of the first transfer roller 4a is partially transferred from the second principal surface 112 of the laminated body 110 to respective portions of the first side surfaces 113 and second side surface 114 thus to form a first external electrode pattern 121a. The conductive paste 10 filling the inside of the pair of second grooves h2, h3 of the first transfer roller 4a is partially transferred from the second principal surface 112 of the laminated body 110 to respective portions of the first side surfaces 113, second side surface 114, first end surface 115, and second end surface 116 to form a pair of second external electrode patterns 122a, 123a.

The width of the first groove h1 is larger than the width for each of the pair of second grooves h2, h3, and a maximum thickness of the first external electrode pattern 121a on the second principal surface 112 is thus larger than a maximum thickness of the pair of second external electrode patterns 122a, 123a on the second principal surface 112.

The width of one second groove h2 of the pair of second grooves h2, h3 is larger than the width of the other second groove h3 of the pair of second grooves h2, h3, and a length of the second external electrode pattern 122a in the length direction L is thus larger than that of the second external electrode pattern 123a.

A portion of the conductive paste 10 filling the inside of the pair of second grooves h2 also extends to the first end surface 115 and the second end surface 116 from the second principal surface 112, unlike a portion of the conductive paste 10 filling the inside of the first groove h1, and thus, as viewed from the laminating direction W, an end of the pair of second external electrode patterns 122a, which is located closest to the first principal surface 111, is located farther from the first principal surface 111 than an end of the first external electrode pattern 121a, which is located closest to the first principal surface 111.

Next, the first external electrode pattern 121a and the pair of second external electrode patterns 122a, 123a formed on the laminated body 110 are subjected to baking. Thus, baked layers defining base electrode layers are formed (step S9). The baking temperature is, for example, about 840° C.

Next, ceramic dielectric slurry is applied to the surface of the laminated body 110. According to a preferred embodiment of the present invention, the ceramic dielectric slurry is preferably applied to the surface of the laminated body 110 by a roller transfer method. However, the method to apply the ceramic dielectric slurry is not limited to the roller transfer method, and may be a spray coating method or a dip method, for example.

Figure 14:
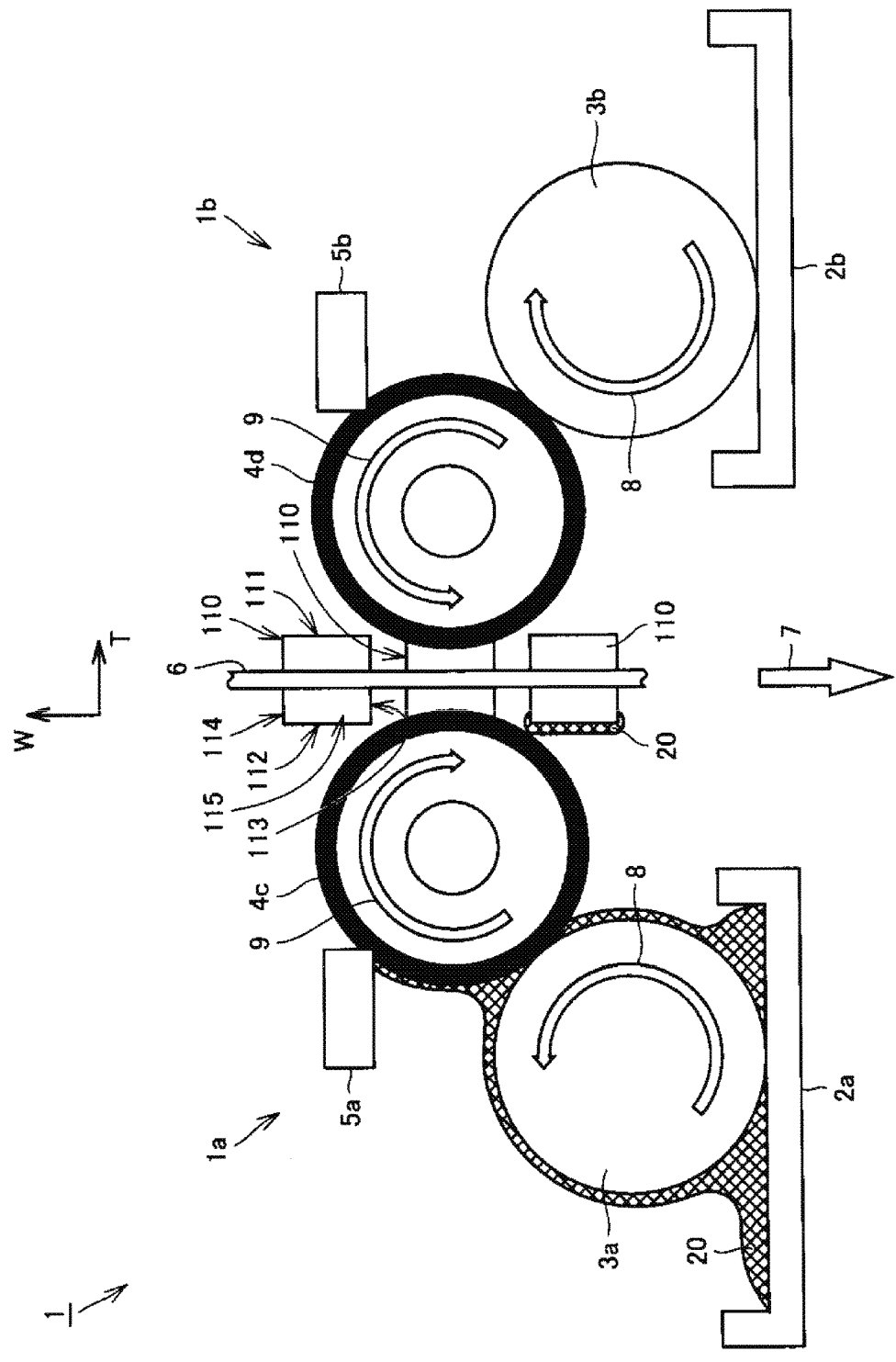
FIG. 14 is a diagram illustrating the configuration of an application system to apply ceramic dielectric slurry to the laminated body of the multilayer ceramic capacitor according to a preferred embodiment of the present invention.
Figure 15:
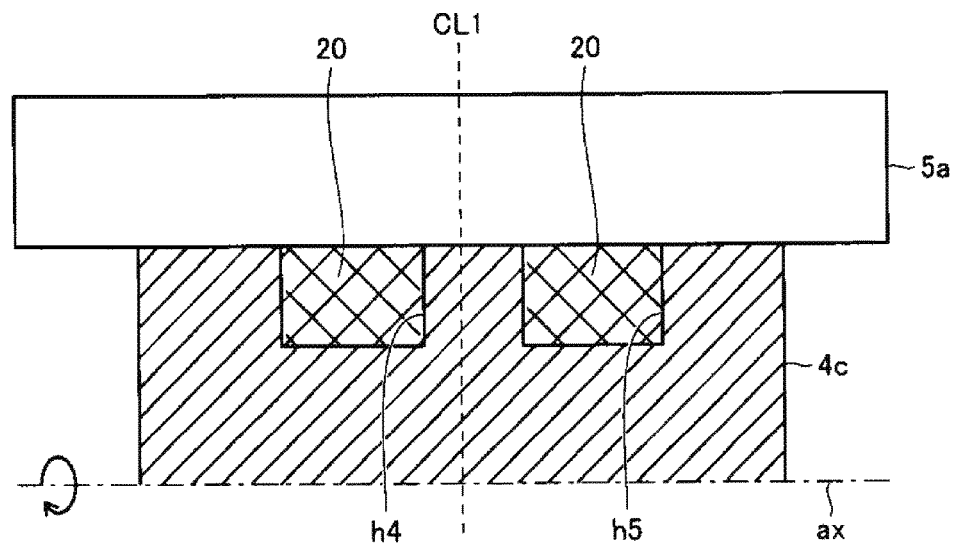
FIG. 15 is a cross-sectional view illustrating a first transfer roller and a first scraper in contact with each other in the application system shown in FIG. 14.

FIG. 14 is a cross-sectional view illustrating the configuration of an application system to apply the ceramic dielectric slurry to the laminated body of the multilayer ceramic capacitor according to a preferred embodiment of the present invention. FIG. 15 is a cross-sectional view illustrating a first transfer roller and a first scraper in contact with each other in the application system shown in FIG. 14.

As shown in FIGS. 14 and 15, the application system 1 includes a first application mechanism 1a and a second application mechanism 1b spaced apart from each other. The first application mechanism 1a includes a first container 2a that stores ceramic dielectric slurry 20, a first supply roller 3a partially located in the first container 2a, a first transfer roller 4c in rolling contact with an outer peripheral surface of the first supply roller 3a, and a first scraper 5a in abutment with an outer peripheral surface of the first transfer roller 4c.

Likewise, the second application mechanism 1b includes a second container 2b, a second supply roller 3b partially located in the second container 2b, a second transfer roller 4d in rolling contact with an outer peripheral surface of the second supply roller 3b, and a second scraper 5b in abutment with an outer peripheral surface of the second transfer roller 4d. The second container 2b is not filled with the ceramic dielectric slurry 20.

The first transfer roller 4c and the second transfer roller 4d each include a cylindrical body, and an elastic portion that covers the outer periphery of the body. While the body preferably is composed of iron, the material of the body is not limited to any iron, and may be other metals, or composite materials such as CFRP (Carbon Fiber Reinforced Plastics), for example. While the elastic portion preferably includes a silicone rubber, the material of the elastic portion is not limited to any silicone rubber, and may be other rubbers that have moderate deformation resistance, for example.

The first transfer roller 4c and the second transfer roller 4d each rotate around a rotation axis ax. For each of the first transfer roller 4c and the second transfer roller 4d, the outer peripheral surface is provided with a pair of third grooves h4, h5 which are continuous annularly. The pair of third grooves h4, h5 is spaced apart from each other in the direction of the rotation axis ax at the outer surface for each of the first transfer roller 4c and second transfer roller 4d. The pair of third grooves h4, h5 for each of the first transfer roller 4c and second transfer roller 4d is provided in locations corresponding to the locations between each of the pair of second grooves h2, h3 and the first groove h1 for each of the first transfer roller 4a and second transfer roller 4b.

One third groove h4 of the pair of third grooves h4, h5 is provided in a location corresponding to the location between the second groove h2 and the first groove h1 for each of the first transfer roller 4a and second transfer roller 4b. The other third groove h5 of the pair of third grooves h4, h5 is provided in a location corresponding to the location between the second groove h3 and the first groove h1 for each of the first transfer roller 4a and second transfer roller 4b. The third groove h4 is located closer to a center line CL1 perpendicular or substantially perpendicular to the rotation axis ax than the third groove h5.

A width for each of the pair of third grooves h4, h5 is larger than the width of the first groove h1. The cross-sectional shape of the inside region for each of the pair of third grooves h4, h5 is rectangular or substantially rectangular, but not limited to the rectangular or substantially rectangular shape, and may be semi-circular, semi-elliptical, or other suitable shapes, for example.

The operation of the application system 1 to apply the ceramic dielectric slurry 20 to the laminated body 110 of the multilayer ceramic capacitor 100 will be described below. First, the first supply roller 3a and the second supply roller 3b are respectively rotated in directions opposite to each other as indicated by arrows 8. Thus, the ceramic dielectric slurry 20 in the first container 2a adheres to the outer peripheral surface of the first supply roller 3a.

In addition, the first transfer roller 4c and the second transfer roller 4d are respectively rotated in directions opposite to each other as indicated by arrows 9. The first transfer roller 4c comes into rolling contact with the first supply roller 3a. The second transfer roller 4d comes into rolling contact with the second supply roller 3b. Thus, the ceramic dielectric slurry 20 adhering to the outer peripheral surface of the first supply roller 3a is transferred to the outer surface of the first transfer roller 4c.

As shown in FIG. 15, the first scraper 5a in slide contact with the outer surface of the first transfer roller 4c fills the inside of the pair of third grooves h4, h5 with the ceramic dielectric slurry 20 transferred to the outer peripheral surface of the first transfer roller 4c, and scrapes off the excess of the paste.

Next, a plurality of laminated bodies 110 with first external electrodes 121 and pairs of second external electrodes 122 are formed, which are supported with a carrier tape 6 attached to each of first end surfaces 115 and second end surfaces 116 pass between the first transfer roller 4c and the second transfer roller 4d in the conveying direction indicated by an arrow 7, while being sequentially sandwiched between the first transfer roller 4c and the second transfer roller 4d. In this regard, the length direction L of the laminated body 110 and the direction of the rotation axis ax are parallel or substantially parallel, and the laminating direction W of the laminated body 110 and the conveying direction of the laminated body 110 are parallel or substantially parallel. The conveying speed of the laminated body 110 is equal or substantially equal to the rotation speed of the outer periphery for each of the first transfer roller 4c and the second transfer roller 4d.

Figure 16:
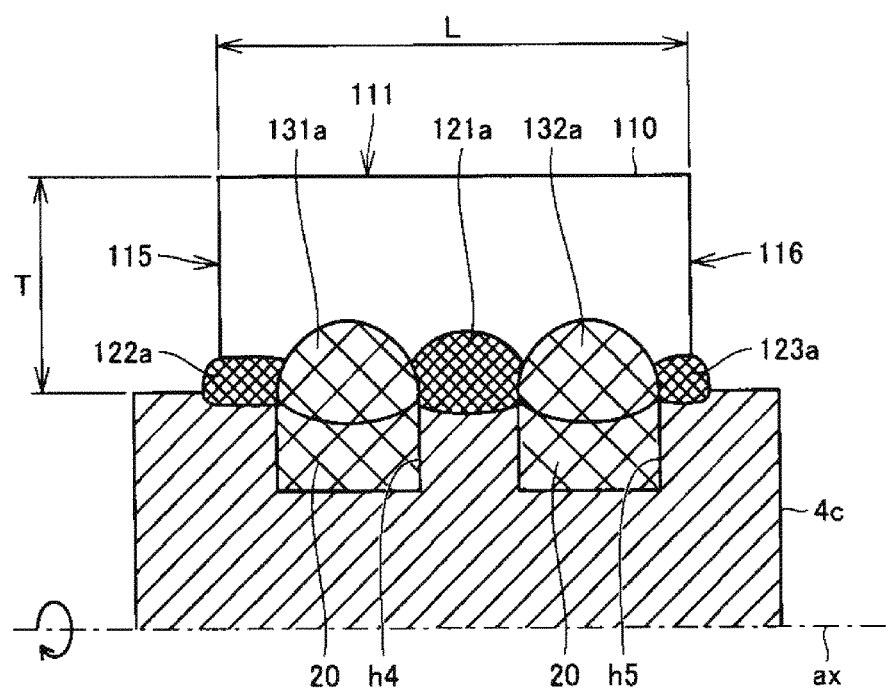
FIG. 16 is a cross-sectional view illustrating the first transfer roller and the laminated body in contact with each other in the application system shown in FIG. 14.

FIG. 16 is a cross-sectional view illustrating the first transfer roller and the laminated body in contact with each other in the application system shown in FIG. 14.

As shown in FIGS. 14 and 16, the ceramic dielectric slurry 20 filling the inside of the pair of third grooves h4, h5 of the first transfer roller 4c is partially transferred from the second principal surface 112 of the laminated body 110 to respective portions of the first side surfaces 113 and second side surface 114 to form a pair of insulating coating patterns 131a, 132a.

The width of each of the pair of third grooves h4, h5 is larger than the width of the first groove h1, and a maximum thickness of the pair of insulating coating patterns 131a, 132a on the second principal surface 112 is thus larger than the maximum thickness of the first external electrode pattern 121a on the second principal surface 112.

The sandwiching pressure on the laminated body 110 between the first transfer roller 4c and the second transfer roller 4d is higher than the sandwiching pressure on the laminated body 110 between the first transfer roller 4a and the second transfer roller 4b, and thus, as viewed from the laminating direction W, an end of the pair of insulating coating patterns 131a, 132a, which is located closest to the first principal surface 111, is located closer to the first principal surface 111 than an end of the first external electrode pattern 121a and pair of second external electrode patterns 122a, 123a, which is located closest to the first principal surface 111.

It is to be noted that the elastic portion for each of the first transfer roller 4c and second transfer roller 4d may include a softer material than the elastic portion for each of the first transfer roller 4a and the second transfer roller 4b.

Next, the pair of insulating coating patterns 131a, 132a formed on the laminated body 110 is subjected to baking. Thus, the pair of insulating coating portions 131, 132 is formed on the outer surface of the laminated body 110 (step S10). The baking temperature is set to a lower temperature than the firing temperature for the laminated chip. When the material of the insulating coating portions 130 is a dielectric ceramic, the baking temperature is preferably, for example, about 900° C. When the material of the insulating coating portions 130 is a resin, the baking temperature is preferably, for example, about 300° C. When the material of the insulating coating portions 130 is glass, the baking temperature is preferably, for example, about 600° C. or higher and about 750° C. or lower.

Next, the laminated body 110 including the base electrode layers is subjected to plating treatment. The base electrode layers are subjected to Ni plating and Sn plating in this order to form Ni plated layers and Sn plated layers, thus forming the first external electrode 121 and the pair of second external electrodes 122, 123 on the outer surface of the laminated body 110 (step S11).

The multilayer ceramic capacitor 100 may be manufactured through the series of steps described above.

In the multilayer ceramic capacitor 100 manufactured using the foregoing manufacturing method, the length of the end 142b1 of the first extended electrode portion 142b extended to the second principal surface 112 in the length direction L is equal or substantially equal to the length of the end 142c1 of the second extended electrode portion 142c extended to the second principal surface 112 in the length direction, and the length of one second external electrode 122 in the length direction is larger than the length of the other second external electrode 123 in the length direction.

Thus, the length L1 of the first contact portion S1 with the second external electrode 122 in contact with the first extended electrode portion 142b in the length direction L is larger than the length L2 of the second contact portion S2 with the second external electrode 123 in contact with the second extended electrode portion 142c in the length direction L, and the relationship of L1/L2>1.0 is satisfied.

For this reason, the electrical resistance differs between the side with one second external electrode 122 and the side with the other second external electrode 123, and in the mounted structure 200 with the multilayer ceramic capacitor 100 and an integrated circuit, such as the IC 203, mounted on the multilayer wiring substrate 202, the current flowing from the power supply 250 to the ground passes primarily through the side with the second external electrode 123 as a higher resistance side, rather than the side with the second external electrode 122 as a lower resistance side, and is extracted from the first external electrode 121 at frequencies around the antiresonant frequency. As a result, the power impedance is able to be lowered at frequencies around the antiresonant frequency.

In addition, even when the capacitor is configured such that the extended electrode portions 141b of the first internal electrode layers 141 protrude from the first external electrode 121, the first extended electrode portions 142b of the second internal electrode layers 142 protrude from the second external electrode 122, and the second extended electrode portions 142c of the second internal electrode layers 142 protrude from the second external electrode 123, the extended electrode portions 141b protrude from the first external electrode 121, the first extended electrode portions 142b of the second internal electrode layers 142 protrude from the second external electrode 122, and the second extended electrode portions 142c of the second internal electrode layers 142 protrude from the second external electrode 123 are covered with the insulating coating portions 131, 132, thus effectively ensuring and improving reliability.

Second Preferred Embodiment

Figure 17:
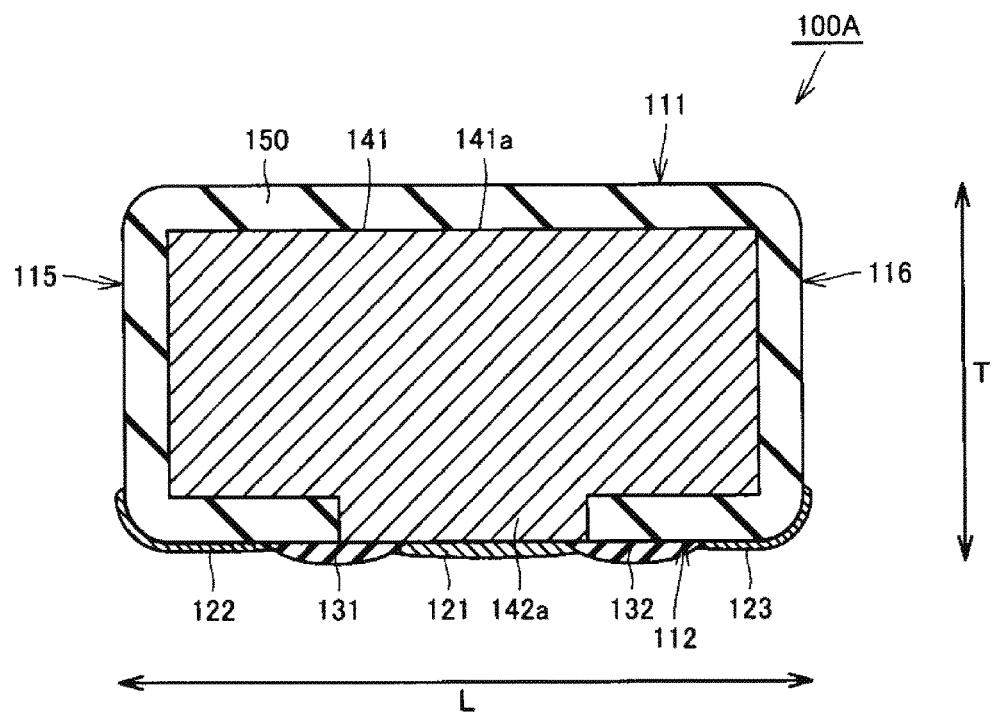
FIG. 17 is a vertical cross-sectional view of a multilayer ceramic capacitor according to a preferred embodiment of the present invention, including a first internal electrode.
Figure 18:
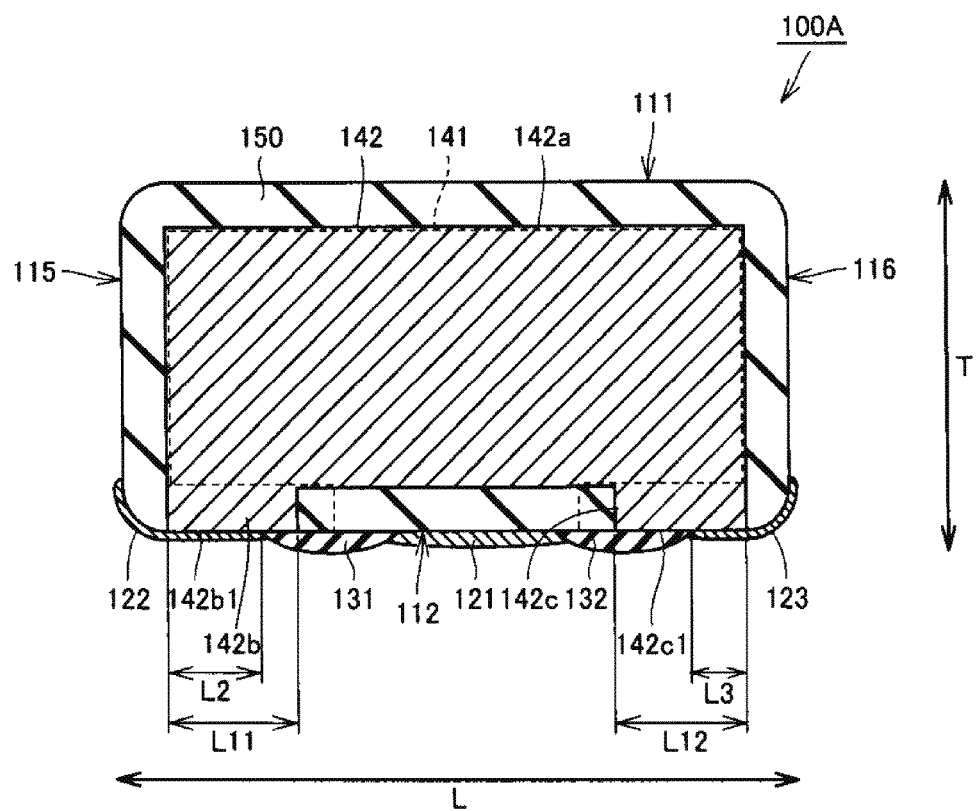
FIG. 18 is a vertical cross-sectional view of the multilayer ceramic capacitor according to a preferred embodiment of the present invention, including a second internal electrode.

FIG. 17 is a vertical cross-sectional view of a multilayer ceramic capacitor according to a second preferred embodiment of the present invention, including a first internal electrode. FIG. 18 is a vertical cross-sectional view of the multilayer ceramic capacitor according to the second preferred embodiment, including a second internal electrode. The multilayer ceramic capacitor according to the second preferred embodiment will be described with reference to FIGS. 17 and 18.

As shown in FIGS. 17 and 18, a multilayer ceramic capacitor 100A according to the second preferred embodiment differs from the first preferred embodiment in how the pair of insulating coating portions is overlapped with the first external electrode and the pair of second external electrodes. The remaining configuration of the second preferred embodiment is substantially the same as that of the first preferred embodiment.

A pair of insulating coating portions 131, 132 includes overlapping portions overlapping with respective portions of a first external electrode 121 and a pair of second external electrodes 122, 123 in the length direction L. The overlapping portions of the pair of insulating coating portions 131, 132 are covered with the respective portions of the first external electrode 121 and pair of second external electrodes 122, 123.

Specifically, an end of the insulating coating portion 131, which is closer to a first end surface 115, is covered with an end of the second external electrode 122, which is closer to a second end surface 116, and an end of the insulating coating portion 131, which is closer to the second end surface 116, is covered with an end of the first external electrode 121, which is closer to the first end surface 115.

An end of the insulating coating portion 132, which is closer to the first end surface 115, is covered with an end of the first external electrode 121, which is closer to the second end surface 116, and an end of the insulating coating portion 133, which is closer to the second end surface 116, is covered with an end of the second external electrode 123, which is closer to the first end surface 115.

With this configuration, the insulating coating portions 131, 132 are formed prior to the first external electrode 121 and the pair of second external electrodes 122, 123. Thus, when applying the conductive paste 10 used form the external electrodes, the insulating coating portions 131, 132 define and function as banks to prevent a first external electrode pattern 121a and a pair of second external electrode patterns 122a, 123a from being coupled.

The multilayer ceramic capacitor 100A according to the second preferred embodiment is manufactured substantially in accordance with the method for manufacturing the multilayer ceramic capacitor according to the first preferred embodiment described above. According to the present preferred embodiment, the step S10 (the step of forming the insulating coating portions) is performed prior to the step S9 (the step of forming the base electrode layers) according to the first preferred embodiment described above. Thus, the multilayer ceramic capacitor 100A according to the second preferred embodiment is able to be manufactured.

The multilayer ceramic capacitor 100A according to the second preferred embodiment achieves the same or substantially the same advantageous effects as the first preferred embodiment.

Third Preferred Embodiment

Figure 19:
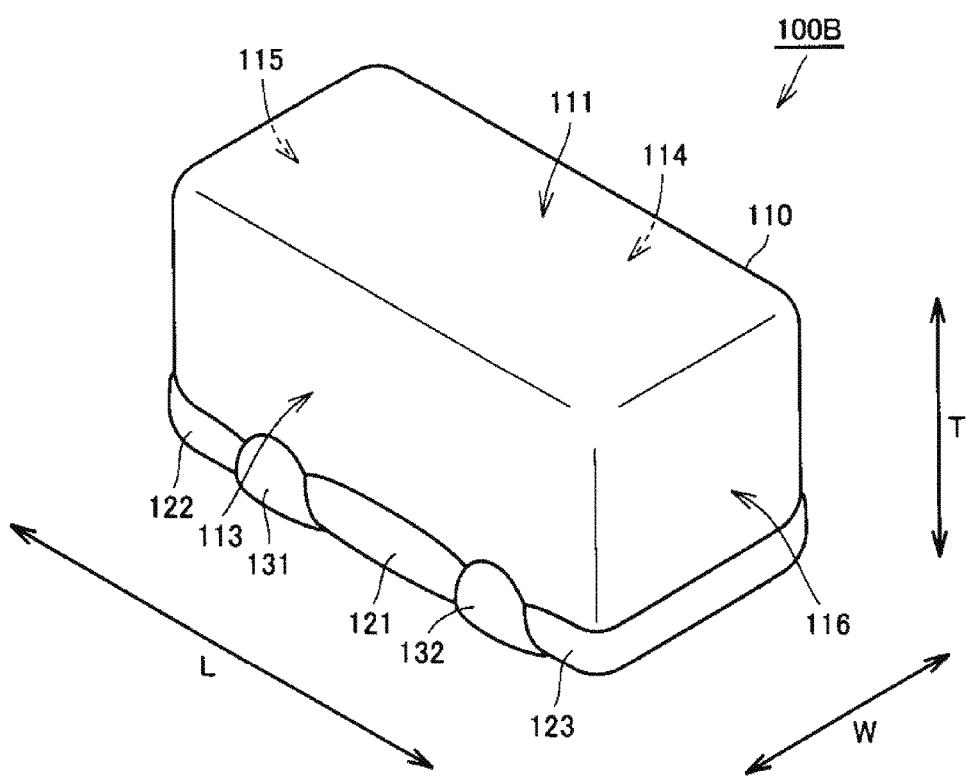
FIG. 19 is a perspective view of a multilayer ceramic capacitor according to a preferred embodiment of the present invention.
Figure 20:
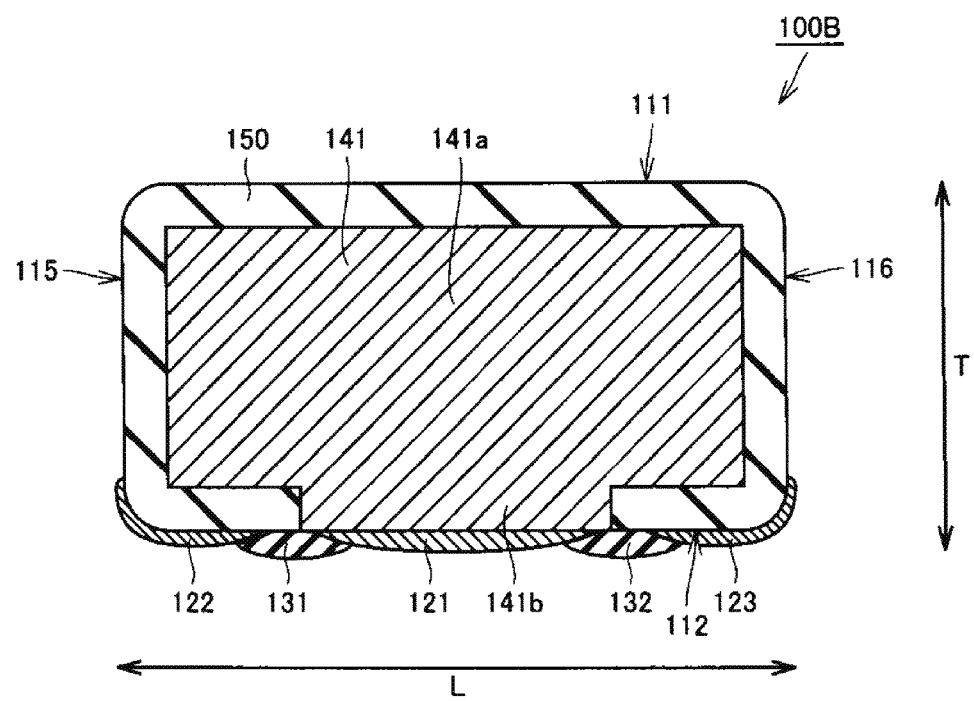
FIG. 20 is a vertical cross-sectional view of a multilayer ceramic capacitor according to a preferred embodiment of the present invention, including a first internal electrode.
Figure 21:
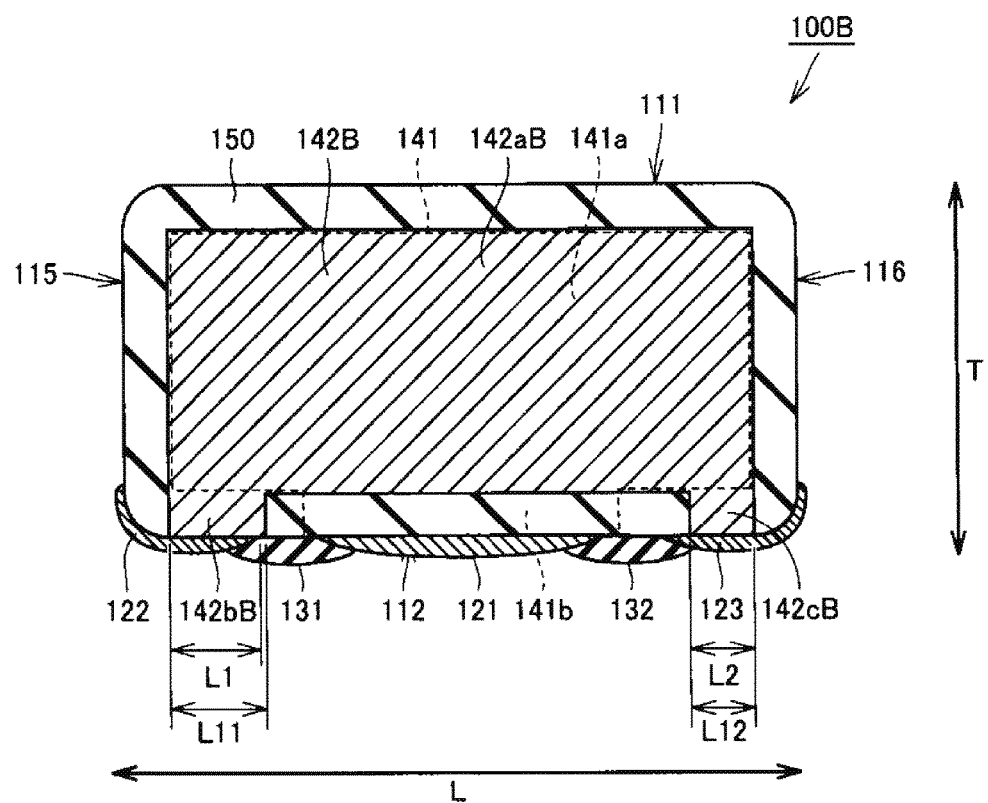
FIG. 21 is a vertical cross-sectional view of the multilayer ceramic capacitor according to a preferred embodiment of the present invention, including a second internal electrode.

FIG. 19 is a perspective view of a multilayer ceramic capacitor according to a third preferred embodiment of the present invention. FIG. 20 is a vertical cross-sectional view of the multilayer ceramic capacitor according to the third preferred embodiment, including a first internal electrode. FIG. 21 is a vertical cross-sectional view of the multilayer ceramic capacitor according to the third preferred embodiment, including a second internal electrode. A multilayer ceramic capacitor 100B according to the third preferred embodiment will be described with reference to FIGS. 19 through 21.

As shown in FIGS. 19 through 21, the multilayer ceramic capacitor 100B according to the third preferred embodiment differs from the first preferred embodiment primarily in the configuration of the internal electrode layers 140 and the relationship in length between the pair of second external electrodes 122, 123. The remaining configuration of the third preferred embodiment is substantially the same as that of the first preferred embodiment.

As shown in FIG. 20, first internal electrode layers 141 each include an opposed electrode portion 141a opposite to a second internal electrode layer 142, and an extended electrode portion 141b extended from the opposed electrode portion 141a to a second principal surface 112 of a laminated body 110.

The extended electrode portion 141b of the first internal electrode layer 141 is extended to a central portion of the second principal surface 112 in the length direction L. The extended electrode portion 141b is connected to the first external electrode 121.

An end of the extended electrode portion 141b closer to the first end surface 115 extends to the first end surface 115 from the region with the first external electrode 121 provided on the second principal surface 112, so as not to come into contact with the second external electrode 122.

The end of the extended electrode portion 141b, protruded from the first external electrode 121, is covered with the insulating coating portion 131. Thus, the extended electrode portions 141b is prevented from being exposed to the outside.

The extended electrode portion 141b closer to the second end surface 116 extends to the second end surface 116 from the region with the first external electrode 121 provided on the second principal surface 112, so as not to come into contact with the second external electrode 123.

The end of the extended electrode portion 141b, protruded from the first external electrode 121, is covered with the insulating coating portion 132. Thus, the extended electrode portions 141b is prevented from being exposed to the outside.

It is to be noted that the end of the extended electrode portion 141b, which is located closer to the first end surface 115, may be covered with the first external electrode 121, and the end of the extended electrode portion 141b, which is located closer to the second end surface 116, may be covered with the first external electrode 121.

As shown in FIG. 21, second internal electrode layers 142 each include an opposed electrode portion 142a opposite to the opposed electrode portion 141a of the first internal electrode layer 141, and a first extended electrode portion 142b and a second extended electrode portion 142c extended from the opposed electrode portion 142a to the second principal surface 112 of the laminated body 110.

The first extended electrode portion 142b is connected to the second external electrode 122. An end 142b1 of the first extended electrode portion 142b closer to the second end surface 116 at the second principal surface 112 extends to the second end surface 116 from the region with the second external electrode 122 on the second principal surface 112, so as not to come into contact with the first external electrode 121.

The end of the first extended electrode portion 142b, protruded from the second external electrode 122, is covered with the insulating coating portion 131. Thus, the first extended electrode portions 142b is prevented from being exposed to the outside.

The second extended electrode portion 142c is connected to the second external electrode 123. The end 142c1 of the second extended electrode portion 142c closer to the first end surface 115 at the second principal surface 112 is disposed within the region with the second external electrode 123 provided on the second principal surface 112.

The length L11 of the end 142b1 of the first extended electrode portion 142b to the second principal surface 112 in the length direction L is larger than the length L12 of the end 142c1 of the second extended electrode portion 142c extended to the second principal surface 112 in the length direction, and on the second principal surface 112, the length of one second external electrode 122 in the length direction is larger than the length of the other second external electrode 123 in the length direction.

Thus, the length L1 of the first contact portion S1 with the second external electrode 122 in contact with the first extended electrode portion 142b in the length direction L is larger than the length L2 of the second contact portion S2 with the second external electrode 123 in contact with the second extended electrode portion 142c in the length direction L. More specifically, the relationship of L1/L2>1.0 is satisfied.

The multilayer ceramic capacitor 100B according to the third preferred embodiment is manufactured substantially in accordance with the method for manufacturing the multilayer ceramic capacitor according to the first preferred embodiment. According to the third preferred embodiment, in a step in accordance with step S9 according to the first preferred embodiment (the step of forming the base electrode layers), the pair of second grooves h2, h3 is configured to be equal or substantially equal in width, and the first transfer roller 4a and the second transfer roller 4b are used which are configured to be symmetrical or substantially symmetrical in positional relationship with respect to the first groove h1. In addition, in a step in accordance with step S10 according to the first preferred embodiment (the step of forming the insulating coating portions), the first transfer roller 4c and the second transfer roller 4d are configured such that the pair of third grooves h4, h5 is symmetrical or substantially symmetrical in positional relationship with respect to the center line CL1 perpendicular or substantially perpendicular to the rotation axis ax.

Almost the same process as step S1 to step S8 according to the first preferred embodiment is performed for manufacturing the multilayer ceramic capacitor 100B according to the third preferred embodiment. Next, a step in accordance with step S9 according to the first preferred embodiment (the step of forming the base electrode layers) is performed using the first transfer roller 4a and second transfer roller 4b described above, thus forming base electrodes for the first external electrode 121 and pair of second external electrodes 122, 123 according to the third preferred embodiment.

Next, in a step in accordance with step S10 according to the first preferred embodiment (the step of forming the insulating coating portions), the first transfer roller 4c and second transfer roller 4d described above are used to form the insulating coating portion 131 and insulating coating portion 132 according to the third preferred embodiment. Thereafter, step S11 according to the first preferred embodiment (the step of forming the plated layers) is performed, thus manufacturing the multilayer ceramic capacitor 100B according to the third preferred embodiment.

The multilayer ceramic capacitor 100B according to the third preferred embodiment achieves the same or substantially the same advantageous effects as the first preferred embodiment.

FIG. 22 is a diagram showing conditions and results of a verification experiment performed to confirm the advantageous effects of a multilayer ceramic capacitor according to preferred embodiments of the present invention. The verification experiment performed to confirm the advantageous effects of the multilayer ceramic capacitor according to preferred embodiments of the present invention will be described with reference to FIG. 22.

As shown in FIG. 22, multilayer ceramic capacitors according to Examples 1 to 5 were prepared by varying the value of L1/L2 in the multilayer ceramic capacitor 100 according to the first preferred embodiment. In addition, a multilayer ceramic capacitor according to a Comparative Example 1 was prepared which satisfied the relationship of L1/L2=1.

In Example 1, the relationship of L1/L2=9.0 was used. In this case, in the equivalent circuit described above, the resistance R22 was about 2.22Ω at the side with the first extended electrode portion 142b (second external electrode 122), and the resistance R23 was about 20.00Ω at the side with the first extended electrode portion 142b (second external electrode 122).

In Example 2, the relationship of L1/L2=1.2 was used. In this case, in the equivalent circuit described above, the resistance R22 was about 3.67Ω at the side with the first extended electrode portion 142b (second external electrode 122), and the resistance R23 was about 4.40Ω at the side with the first extended electrode portion 142b (second external electrode 122).

In Example 3, the relationship of L1/L2=1.4 was used. In this case, in the equivalent circuit described above, the resistance R22 was about 3.43Ω at the side with the first extended electrode portion 142b (second external electrode 122), and the resistance R23 was about 4.79Ω at the side with the first extended electrode portion 142b (second external electrode 122).

In Example 4, the relationship of L1/L2=1.6 was used. In this case, in the equivalent circuit described above, the resistance R22 was about 3.25Ω at the side with the first extended electrode portion 142b (second external electrode 122), and the resistance R23 was about 5.19Ω at the side with the first extended electrode portion 142b (second external electrode 122).

In Example 5, the relationship of L1/L2=1.7 was used. In this case, in the equivalent circuit described above, the resistance R22 was about 3.17Ω at the side with the first extended electrode portion 142b (second external electrode 122), and the resistance R23 was about 5.41Ω at the side with the first extended electrode portion 142b (second external electrode 122).

In Comparative Example 1, the relationship of L1/L2=1.0 was used. In this case, in the equivalent circuit described above, the resistance R22 was about 4.00Ω at the side with the first extended electrode portion 142b (second external electrode 122), and the resistance R23 was about 4.00Ω at the side with the first extended electrode portion 142b (second external electrode 122).

It is to be noted that the resistance R21 was about 4.00Ω at the side with the extended electrode portion 141b of the first internal electrode layer in the multilayer ceramic capacitors according to Examples 1 through 5 and Comparative Example 1.

The multilayer ceramic capacitors according to Examples 1 through 5 and Comparative Example 1 were each mounted on the multilayer wiring substrate 202 along with the IC 203, and the relationship was determined between the frequency and the power impedance.

As shown in FIG. 22, as the ratio of L1/L2 was increased, the power impedance was decreased at frequencies around the antiresonant frequency.

Specifically, in Example 2, the power impedance was decreased at frequencies around the antiresonant frequency, although slightly as compared with Comparative Example 1, and in Example 3, the power impedance was decreased at frequencies around the antiresonant frequency as compared with Example 2.

Furthermore, in Example 4, the power impedance was decreased at frequencies around the antiresonant frequency as compared with Example 3, and in Example 5, the power impedance was decreased at frequencies around the antiresonant frequency as compared with Example 4. In Example 1, the power impedance was decreased at frequencies around the antiresonant frequency as compared with Example 5.

From the foregoing results, it has been confirmed that the length L1 of the first contact portion S1 with the second external electrode 122 in contact with the first extended electrode portion 142b in the length direction L and the length L2 of the second contact portion S2 with the second external electrode 123 in contact with the second extended electrode portion 142c in the length direction L satisfy the relationship of L1/L2>1.0, thus making it possible to reduce the power impedance at frequencies around the antiresonant frequency.

In addition, it has been confirmed that the L1 and the L2 preferably satisfy the relationship of L1/L2≤1.2, more preferably satisfy the relationship of L1/L2≤1.4, and further preferably satisfy the relationship of L1/L2≤1.6, for example, in order to lower the power impedance at frequencies around the antiresonant frequency.

While cases where the maximum thickness of the pair of insulating coating portions on the second principal surface is larger than the maximum thickness of the first external electrode thereon and the maximum thickness of the pair of second external electrodes thereon have been exemplified and described in the preferred embodiments described above, the present invention is not limited thereto, and on the second principal surface, the maximum thickness of the pair of insulating coating portions may be smaller than the maximum thickness of the first external electrode and the maximum thickness of the pair of second external electrodes. Also in such a case, the pair of insulating coating portions is provided, thus making it possible to prevent the first external electrode portions and the pair of second extended electrode portions from being exposed to the outside, and achieving the same or substantially the same advantageous effects as in first to third preferred embodiments. It is to be noted that that the thicknesses of the first external electrode, the pair of second external electrodes, and the pair of insulating coating portions are able to be adjusted by appropriately setting the widths of the various types of grooves provided in the first transfer rollers 4a, 4c, the sandwiching pressure on the laminated body 110 between the first transfer roller 4a and the second transfer roller 4b, and the sandwiching pressure on the laminated body 110 between the first transfer roller 4c and the second transfer roller 4d.

While cases where the extended electrode portion of the first internal electrode layer is protruded from the first external electrode, and at least one of the first extended electrode portion and second extended electrode portion of the second internal electrode layer is protruded from the pair of second external electrodes have been exemplified and described in the preferred embodiments described above, the present invention is not limited thereto, and as long as the relationship of L1/L2>1.0 is satisfied, the extended electrode portion of the first internal electrode layer may include no protrusion from the first external electrode, and the first extended electrode portion and second extended electrode portion of the second internal electrode layer both may include no protrusion from the pair of second external electrodes. Also in this case, the relationship of L1/L2>1.0 is satisfied, thus achieving the same or substantially the same effect as in the first to third preferred embodiments. In addition, the pair of insulating coating portions is provided which fills the gaps between each of the pair of second external electrodes and the first external electrode, thus making it possible to reduce or prevent the ingress of moisture and other contaminants into the laminated body 110 from the outside. Thus, the weather resistance is effectively improved.

While cases of multilayer ceramic capacitors for the electronic component have been exemplified and described in the preferred embodiments described above, the present invention is not limited thereto, and various types of electronic components including external electrodes, such as piezoelectric components, thermistors, and inductors, may be used as the electronic component.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
    a laminated body including a plurality of dielectric layers and a plurality of internal electrode layers that are laminated in a laminating direction, a first side surface and a second side surface opposed in the laminating direction, a first principal surface and a second principal surface opposed in a height direction perpendicular or substantially perpendicular to the laminating direction, and a first end surface and a second end surface opposed in a length direction perpendicular or substantially perpendicular to both the laminating direction and the height direction;

a first external electrode provided on a central portion of the second principal surface in the length direction;

a pair of second external electrodes provided on both ends of the second principal surface in the length direction, such that the first external electrode is located between the second external electrodes; and a pair of insulating coating portions filling gaps between each of the pair of second external electrodes and the first external electrode on the second principal surface; wherein the plurality of internal electrode layers include a plurality of first internal electrode layers connected to the first external electrode, and a plurality of second internal electrode layers connected to each of the pair of second external electrodes;

each of the second internal electrode layers includes a first extended electrode portion connected to one of the pair of second external electrodes, and a second extended electrode portion connected to another of the pair of second external electrodes; and a relationship of L1/L2>1.0 is satisfied, where a total length of a first contact portion with the one second external electrode in contact with the first extended electrode portion in the length direction is L1, and a total length of a second contact portion with the another second external electrode in contact with the second extended electrode portion in the length direction is L2.

2. The electronic component according to claim 1, wherein a relationship of L1/L2≥1.2 is satisfied.

3. The electronic component according to claim 1, wherein a relationship of L1/L2≥1.4 is satisfied.

4. The electronic component according to claim 1, wherein a relationship of L1/L2≥1.6 is satisfied.

5. The electronic component according to claim 1, wherein a length of an end of the first extended electrode portion extended to the second principal surface in the length direction is larger than a length of an end of the second extended electrode portion extended to the second principal surface in the length direction.

6. The electronic component according to claim 1, wherein a length of an end of the first extended electrode portion extended to the second principal surface in the length direction is equal to or substantially equal to a length of an end of the second extended electrode portion extended to the second principal surface in the length direction; and a length of the one second external electrode in the length direction is larger than a length of the another second external electrode in the length direction.

7. The electronic component according to claim 1, wherein protrusions of the first extended electrode portion and the second extended electrode portion from the pair of second external electrode in the length direction are covered with the pair of insulating coating portions.

8. The electronic component according to claim 1, wherein the pair of insulating coating portions includes overlapping portions overlapping with respective portions of the first external electrode and pair of second external electrodes in the length direction; and the overlapping portions of the pair of insulating coating portions cover the respective portions of the first external electrode and pair of second external electrodes.

9. The electronic component according to claim 1, wherein the pair of insulating coating portions includes overlapping portions overlapping with respective portions of the first external electrode and pair of second external electrodes in the length direction; and the overlapping portions of the pair of insulating coating portions are covered with the respective portions of the first external electrode and pair of second external electrodes.

10. The electronic component according to claim 1, wherein a maximum thickness of the pair of insulating coating portions on the second principal surface is larger than a maximum thickness of the first external electrode thereon and a maximum thickness of the pair of second external electrodes thereon.

11. The electronic component according to claim 1, wherein a maximum thickness of the pair of insulating coating portions on the second principal surface is smaller than a maximum thickness of the first external electrode thereon and a maximum thickness of the pair of second external electrodes thereon.

12. The electronic component according to claim 1, wherein the pair of insulating coating portions are made of a material including a dielectric ceramic, a resin, or glass.

13. The electronic component according to claim 12, wherein the pair of insulating coating portions are made of a material including the dielectric ceramic; and the dielectric ceramic includes $BaTiO_3$, $CaTiO_3$, $SrTiO_3$, or $CaZrO_3$.

14. The electronic component according to claim 12, wherein the pair of insulating coating portions are made of a material including the resin; and the resin includes an epoxy-based resin or a polyimide-based resin.

15. The electronic component according to claim 12, wherein the pair of insulating coating portions are made of a material including the glass; and the glass includes Ba or Sr.

16. The electronic component according to claim 1, wherein the plurality of dielectric layers are made of a perovskite-type compound containing Ba or Ti.

17. The electronic component according to claim 1, wherein each of the plurality of dielectric layers has a thickness of about 0.4 μm or more and about 3 μm or less.

18. The electronic component according to claim 1, wherein each of the plurality of internal electrode layers has a thickness of about 0.3 μm or more and about 1.0 μm or less.

19. The electronic component according to claim 1, wherein the plurality of internal electrode layers are made of one metal selected from the group consisting of Ni, Cu, Ag, Pd, and Au, or an alloy containing the metal.

* * * * *